United States Patent
Kim et al.

(10) Patent No.: US 8,259,073 B2
(45) Date of Patent: Sep. 4, 2012

(54) DISPLAY FOR MULTI-FUNCTION KEYPAD AND ELECTRONIC DEVICE HAVING THE SAME

(75) Inventors: Kyongdo Kim, Yongin-si (KR); Woojong Lee, Yongin-si (KR); Hyunah Jang, Yongin-si (KR); Hyungjun Namgung, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 936 days.

(21) Appl. No.: 12/106,164

(22) Filed: Apr. 18, 2008

(65) Prior Publication Data

US 2008/0284689 A1    Nov. 20, 2008

(30) Foreign Application Priority Data

Apr. 19, 2007 (KR) .................. 10-2007-0038399

(51) Int. Cl.
*G09G 5/00* (2006.01)
(52) U.S. Cl. ...................... 345/169; 345/172
(58) Field of Classification Search .......... 345/156–172, 345/173–179; 200/5 A, 314; 349/154–156
See application file for complete search history.

(56) References Cited

U.S. PATENT DOCUMENTS

| | | | |
|---|---|---|---|
| 4,472,610 A | 9/1984 | Fuller et al. | |
| 5,917,906 A | 6/1999 | Thornton | |
| 6,538,374 B2 | 3/2003 | Hosokawa | |
| 7,232,969 B1 * | 6/2007 | Hsu et al. | 200/310 |
| 2002/0107055 A1 | 8/2002 | Yamazaki et al. | |
| 2002/0180676 A1 * | 12/2002 | Lee | 345/87 |
| 2004/0137142 A1 | 7/2004 | Nishikawa | |
| 2004/0211966 A1 | 10/2004 | Guenther et al. | |
| 2006/0033876 A1 | 2/2006 | Park et al. | |
| 2006/0152668 A1 | 7/2006 | Jang et al. | |
| 2006/0221059 A1 * | 10/2006 | Choi et al. | 345/169 |
| 2007/0029172 A1 * | 2/2007 | Choi et al. | 200/1 B |

(Continued)

FOREIGN PATENT DOCUMENTS

CN    1363200 A    8/2002

(Continued)

OTHER PUBLICATIONS

English machine translation for Japanese publication No. JP 2003-195783, published Jul. 9, 2003 in the name of Okuyama et al., 17 pgs.

(Continued)

*Primary Examiner* — Amare Mengistu
*Assistant Examiner* — Hong Zhou
(74) *Attorney, Agent, or Firm* — Christie, Parker & Hale, LLP

(57) ABSTRACT

A display for a multi-function keypad and an electronic device including the display. The display for a multi-function keypad includes: a display panel having a plurality of display regions arranged in a matrix pattern and a non-display region surrounding the plurality of display regions; a circuit board on the display panel and including a plurality of openings corresponding to the display regions, and a plurality of keys near peripheral edges of the openings and corresponding to the non-display region; and a pad on the circuit board and including a plurality of transparent windows corresponding to the openings, and a plurality of pressing units near peripheral edges of the transparent windows and corresponding to the plurality of keys.

23 Claims, 13 Drawing Sheets

U.S. PATENT DOCUMENTS

| | | | |
|---|---|---|---|
| 2007/0046611 A1 | 3/2007 | Routley et al. | |
| 2007/0152975 A1* | 7/2007 | Ogihara et al. | 345/173 |
| 2007/0152983 A1* | 7/2007 | McKillop et al. | 345/173 |
| 2007/0267497 A1* | 11/2007 | Tracy et al. | 235/454 |
| 2007/0290973 A1* | 12/2007 | Wei | 345/92 |
| 2008/0204418 A1* | 8/2008 | Cybart et al. | 345/173 |
| 2009/0212303 A1* | 8/2009 | Toerker et al. | 257/88 |

FOREIGN PATENT DOCUMENTS

| | | |
|---|---|---|
| CN | 1704875 A | 12/2005 |
| CN | 1726427 A | 1/2006 |
| CN | 1809865 A | 7/2006 |
| GB | 1 593 414 | 7/1981 |
| GB | 2 255 234 A | 10/1992 |
| JP | 04-299407 | 10/1992 |
| JP | 08-167931 | 6/1996 |
| JP | 2003-195783 | 7/2003 |
| JP | 2003-264069 | 9/2003 |
| JP | 2004-165068 | 6/2004 |
| JP | 2004-361806 | 12/2004 |
| KR | 10-2004-0099872 | 12/2004 |
| KR | 10-2006-0082216 | 7/2006 |
| KR | 10-2007-0122345 | 12/2007 |

OTHER PUBLICATIONS

English machine translation of Japanese publication No. JP 2003-264069, published Sep. 19, 2003 in the name of Hitomo et al., 20 pgs.
English machine translation of Japanese publication No. JP 2004-361806, published Dec. 24, 2004 in the name of Yasuda, 19 pgs.
Japanese Patent Office Action dated Jan. 4, 2011, issued in corresponding Japanese application No. 2008-105953, 2 pgs.
EPO Extended Search Report for corresponding European Patent Application No. 08251462.1, dated May 18, 2011, 12 pages.

* cited by examiner

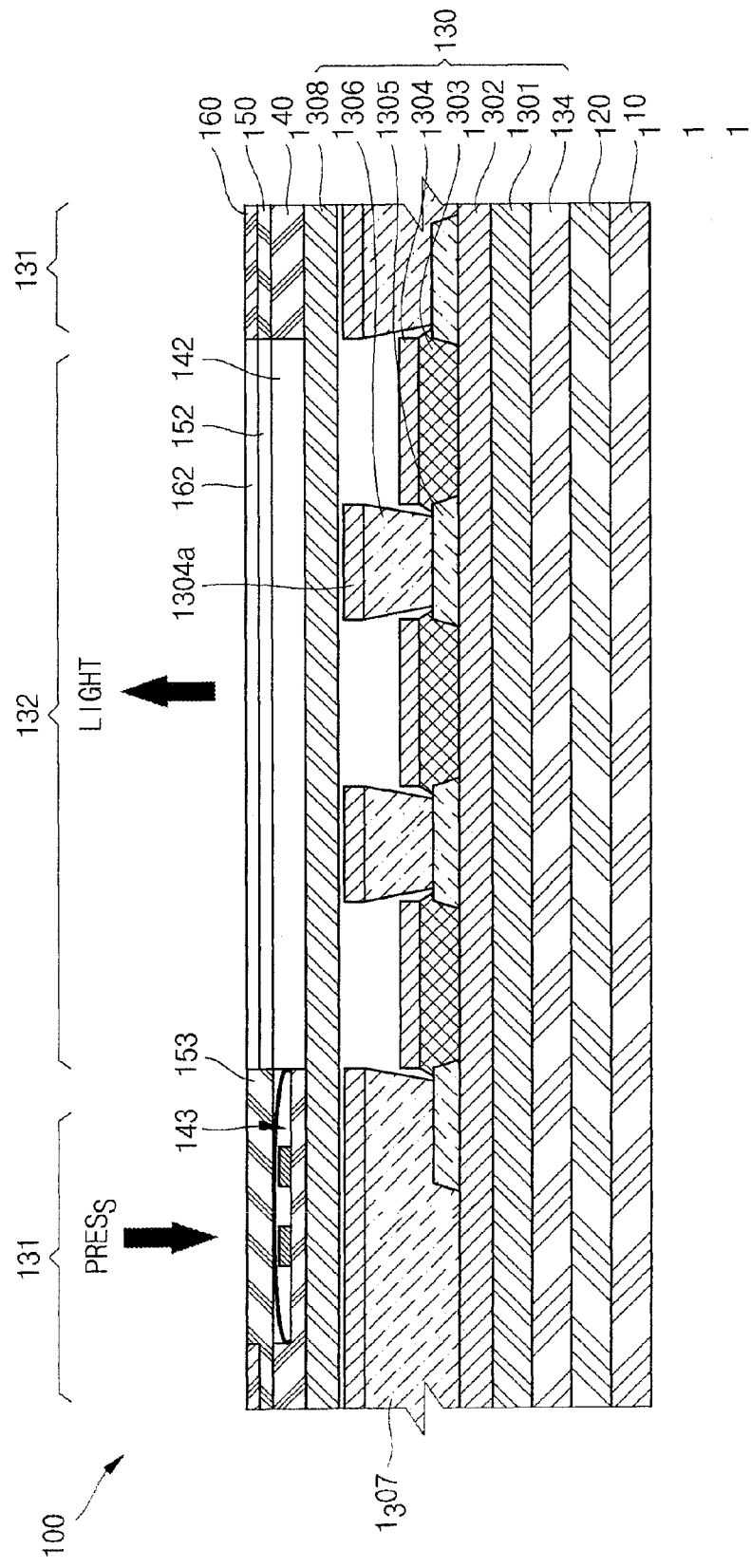

DISPLAY FOR MULTI-FUNCTION KEYPAD AND ELECTRONIC DEVICE HAVING THE SAME

CROSS-REFERENCE TO RELATED APPLICATION

This application claims priority to and the benefit of Korean Patent Application No. 10-2007-0038399, filed on Apr. 19, 2007 in the Korean Intellectual Property Office (KIPO), the entire content of which is hereby incorporated by reference.

BACKGROUND OF THE INVENTION

1. Field of the Invention

The present invention relates to a display for a multi-function keypad.

2. Description of the Related Art

Generally, electronic devices (for example, a mobile communication terminal) include a keypad device for inputting various instructions easily. For example, characters, numbers, or specific symbols are allocated to keys of the keypad device to allow a user to properly perform various functions such as making and receiving phone calls, inputting characters, and sending messages by operating the keypad.

However, in a conventional keypad device, unique characters, numbers, or specific symbols are allocated to respective keys. Therefore, the conventional keypad device is unsuitable for recently developed electronic devices for performing various and complicated functions.

For example, it is difficult or impossible to input characters of different languages using the mobile communication terminal during global roaming because a predetermined character is unchangeably allocated to each key.

In addition, there is another problem that it is inconvenient to use functions such as MP3 function or camera function because the user often needs to operate long key-sequences to use those functions in the mobile communication terminal. In other words, the mobile communication terminal has a deep user interface depth (e.g., multiple cascaded menus), and thus key operations are inconvenient and difficult to operate.

On the other hand, technologies using a touch screen have been developed as a keypad device for solving the problem as described above. However, the touch screen has a problem in that instructions are often not properly inputted or the same instruction is repeatedly inputted several times because the user receives no tactile feedback to confirm that the user successfully touched or pressed the keys. Furthermore, when a keypad device is made of the touch screen, power is supplied to pixels on the entire touch screen, thereby increasing power consumption and manufacturing cost.

SUMMARY OF THE INVENTION

Accordingly, embodiments of the present invention provide a display for multi-function keypad and an electronic device having the display that can input and output various information.

Embodiments of the present invention provide a display for a multi-function keypad and an electronic device having the display that can provide a shallow user interface depth and easy key operation by changing and displaying characters, numbers, specific symbols, still images and moving images according to the user's choice.

Embodiments of the present invention also provide a display for a multi-function keypad and an electronic device having the display that has reduced power consumption and manufacturing cost.

According to an embodiment of the present invention, there is provided a display for a multi-function keypad. The display includes a display panel, a circuit board on the display panel, and a pad on the circuit board. The display panel includes a plurality of display regions arranged in a matrix pattern, and a non-display region surrounding the plurality of display regions. The circuit board includes a plurality of openings corresponding to the display regions, and a plurality of keys at regions of the circuit board near peripheral edges of the openings. The regions of the circuit board correspond to the non-display region. The pad includes a plurality of transparent windows corresponding to the openings and a plurality of pressing units at regions of the pad corresponding to the keys.

According to another embodiment of the present invention, there is provided an electronic device. The electronic device includes a display for a multi-function keypad and a main display panel electrically and mechanically coupled to the display for multi-function keypad. The display for the multi-function keypad includes a display panel, a circuit board on the display panel, and a pad on the circuit board. The display panel includes a plurality of display regions arranged in a matrix pattern, and a non-display region surrounding the plurality of display regions. The circuit board includes a plurality of openings corresponding to the display regions, and a plurality of keys at regions of the circuit board near peripheral edges of the openings. The regions of the circuit board correspond to the non-display region. The pad includes a plurality of transparent windows corresponding to the openings, and a plurality of pressing units at regions of the pad near peripheral edges of the transparent windows. The regions of the pad correspond to the plurality of keys.

As described above, the display for multi-function keypad and the electronic device having the same can input various types of instructions and output various information by the keypad.

In addition, the display for a multi-function keypad and the electronic device having the same can provide a shallow user interface depth and easy key operation by variously changing and displaying characters, numbers, specific symbols, still images and moving images according to the user's choice.

In addition, the display for multi-function keypad and the electronic device having the same have simple mechanical and electrical structure, and thus power consumption and manufacturing cost are reduced, and manufacturing process is simplified.

BRIEF DESCRIPTION OF THE DRAWINGS

The above and other aspects and features of the present invention will be more apparent from the following detailed description taken in conjunction with the accompanying drawings, in which:

FIG. 1b is an exploded perspective view of the keypad of FIG. 1a;

FIG. 4a is a schematic sectional view taken along the 4a-4a line of FIG. 1a, and FIG. 4b is a schematic sectional view taken along the 4b-4b line of FIG. 1a;

DETAILED DESCRIPTION OF EXEMPLARY EMBODIMENTS

Figure 1A:
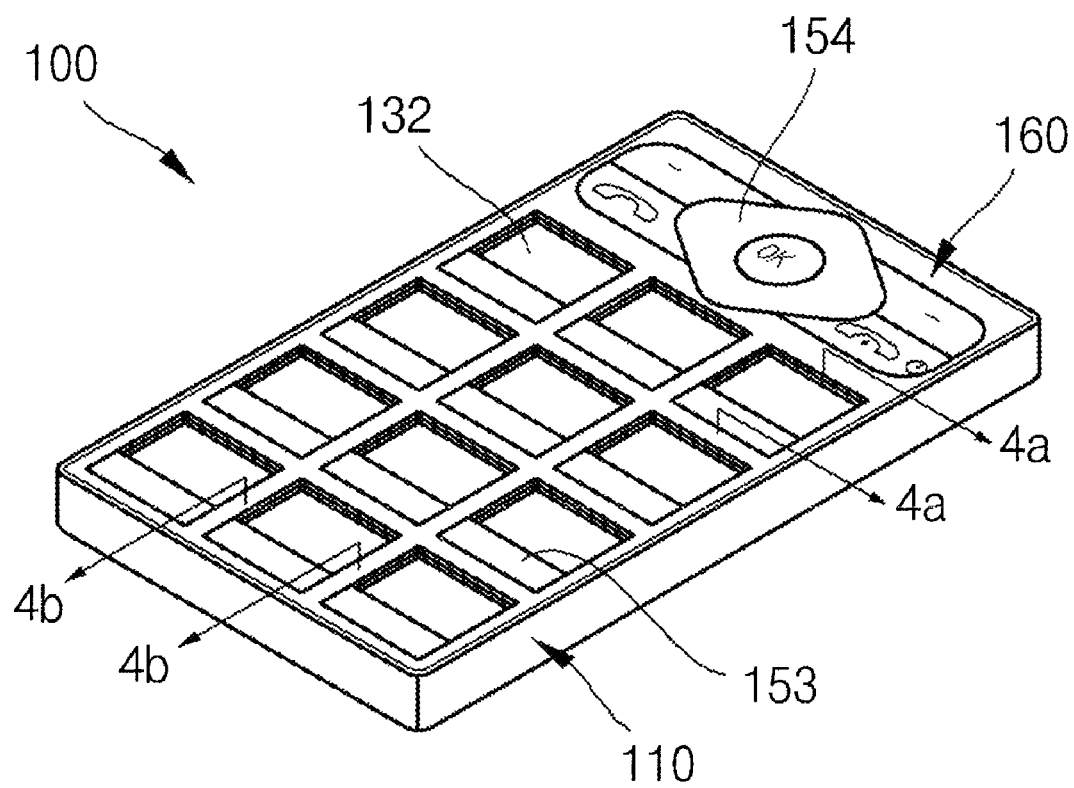
FIG. 1a is a perspective view illustrating an assembled display for a multi-function keypad according to one exemplary embodiment of the present invention.
Figure 1B:
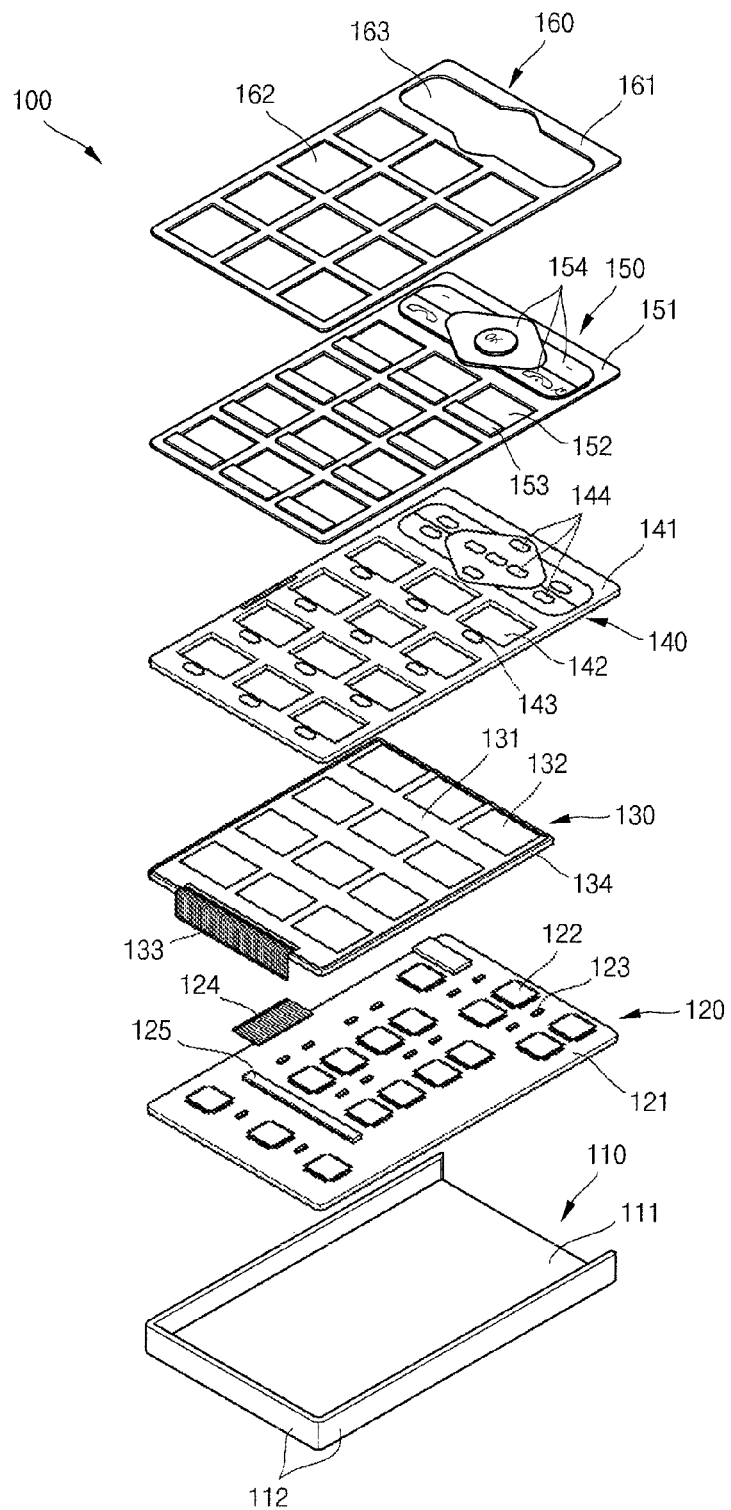

FIG. 1a is a perspective view illustrating an assembled display 100 for a multi-function keypad according to one exemplary embodiment of the present invention, and FIG. 1b shows an exploded perspective view of FIG. 1a.

Referring to FIGS. 1a and 1b, the display 100 for a multi-function keypad includes a case 110, a main circuit board 120 mounted on the case 110, a display panel 130 mounted on the main circuit board 120, a circuit board 140 mounted on the display panel 130, a pad 150 mounted on the circuit board 140, and a cover 160 mounted on the pad 150.

The case 110 includes a bottom surface 111, a plurality of side walls 112 formed in a suitable height (e.g., a predetermined height) around the edges of the bottom surface 111. The case 110 may be formed of any one selected from a plastic resin, a metal or other equivalents, but not limited thereto. In addition, the main circuit board 120, the display panel 130, the circuit board 140, the pad 150 and the cover 160 may be mounted on the case 110 in the order shown in FIG. 1b. A battery (not shown) may be included in the case 110 for supplying power to the main circuit board 120, the display panel 130 and the circuit board 140.

The main circuit board 120 has a substrate body 121 of a roughly rectangular shape, a plurality of active devices 122, a plurality of passive devices 123, a first flexible circuit 124 and a connector 125 mounted on the substrate body. The main circuit board 120 supplies or receives an electrical signal to/from a main display panel of the display panel 130, the circuit board 140 or a main display panel of an electronic device to be described below. The first flexible circuit 124 may be electrically coupled to the circuit board 140. In addition, the connector 125 may be electrically coupled to a second flexible circuit 133 that is connected to the display panel 130 to be described below.

The display panel 130 may include a plurality of display regions 132 arranged in a roughly matrix pattern with a non-display region 131 as a boundary (e.g., surrounding the display regions 132). One side of the display panel 130 may be electrically coupled to the second flexible circuit 133 that is electrically coupled to the connector 125 of the main circuit board 120. In addition, lower and side surfaces of the display panel 130 may be covered by a bezel 134 made of resin or metal to protect the display panel 130 from being damaged by external impact. Here, twelve display regions 132 formed on the display panel 130 are shown in the drawings, but the present invention is not limited thereto. In other words, larger or smaller numbers of the display regions 132 may be formed on the display panel 130 in other embodiments. Further, the display regions 132 formed on the display panel 130 are shown in rectangular shape as an example, but the invention is not limited thereto. In other words, the display regions 132 may be formed in various shapes such as circle, triangle, pentagon, or hexagon. In order embodiments, each of the display regions 132 can display different characters, numbers, specific symbols, still images and moving images according to the user's choice, and thus, a user interface depth becomes shallow (e.g., less levels), and operation of the key also becomes easy. No image is displayed on the non-display region 131 formed outside the display regions 132, thereby reducing or minimizing power consumption. Pixels may be formed in the display regions 132 of the display panel 130 for emitting light of a desired color (e.g., red, green, blue, and mixed color thereof), and pixels are not formed in the non-display region 131 where no light is emitted.

Thus, power is substantially used only in the display regions 132 of the display panel 130 where the pixels are formed, and substantially not used in the non-display region 131 where the pixels are not formed. The display panel 130 may be, for example, any one selected from a passive matrix organic light emitting display, an active matrix organic light emitting display, a liquid crystal display or other equivalent display devices, but the present invention is not limited thereto. The passive matrix organic light emitting display, active matrix organic light emitting display, and liquid crystal display will be explained in more detail below.

The circuit board 140 includes a substrate body 141 having openings 142 formed in regions corresponding to the display regions 132 of the display panel 130, and keys 143 formed in a region corresponding to the non-display region 131 at one side of each of the openings 142. Here, the openings 142 may be closed or covered by any one selected from a transparent resin, a transparent glass, or other equivalents; therefore, the display regions 132 of the display panel 130 may be better protected from the external environment. In addition, a plurality of keys 144 may be formed on regions that do not correspond to the display regions 132 of the display panel 130. That is, a plurality of keys 144 may be formed on regions that do not correspond to the openings 142. The circuit board 140 may be electrically coupled to the main circuit board 120 by the first flexible circuit 124. Thus, control signals for the keys 143 and 144 provided on the circuit board 140 can be properly transmitted to the main circuit board 120 through the first flexible circuit 124. The structure of the keys 143 will be explained in more detail below.

The pad 150 includes a pad body 151 having transparent windows 152 formed in the regions corresponding to the openings 142, that is, the regions corresponding to the display regions 132, and pressing units 153 formed in the regions at one side of the transparent windows 152 and corresponding to the keys 143. A plurality of pressing units 154 may be formed on regions which do not correspond to the display regions 132 of the display panel 130 or the openings 142 of the circuit board 140. In other words, the plurality of pressing units 154 may be formed in the region corresponding to the keys 144 of the circuit board 140. Characters, numbers and special symbols may be formed on the surfaces of the pressing units 154 by methods such as intaglio, engraving or printing. In addition, the transparent windows 152 may be closed or covered by one selected from a transparent resin, a transparent glass or other equivalents. When a user presses the pressing units 153 and 154, the corresponding keys 143 and 144 are operated.

Then, control signals for the keys 143 and 144 can be transmitted to the main circuit board 120 through the first flexible circuit 124. The structures of the pressing units 153 and pad 150 from a sectional view will be explained in more detail below.

The cover 160 includes a cover body 161 having windows 162 formed in regions corresponding to the transparent windows 152 of the pad 150 and the pressing unit 153. Thus, the display regions 132 of the display panel 130 are exposed to the outside through the windows 162 of the cover 160. Thus, the user can input an instruction by operating the pressing units 153 exposed through the windows 162 of the cover 160. In addition, an elongated window 163 may be formed on the cover 160 so as to expose the pressing units 154 of the pad 150 provided with characters previously formed by methods such as intaglio, engraving or printing. In addition, the windows 162 and 163 may be closed or covered by any one selected from a transparent resin, a transparent glass or other equivalents.

Figure 2:
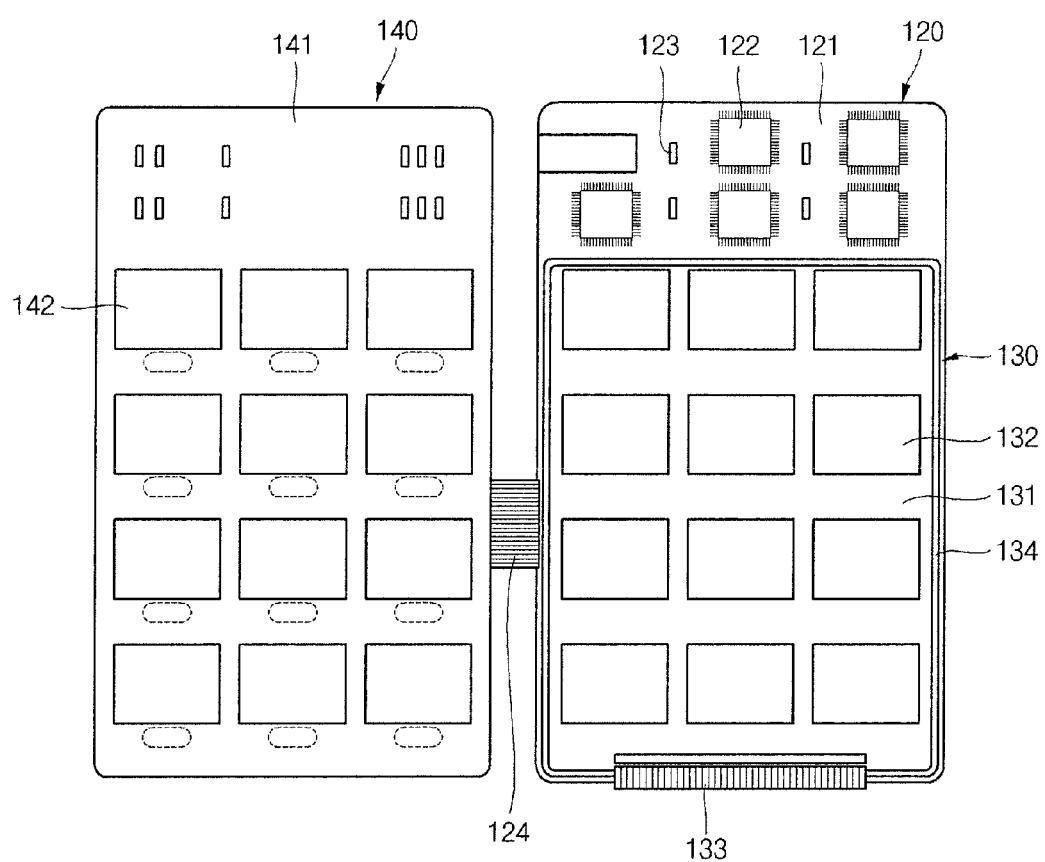
FIG. 2 is a plan view illustrating a display panel mounted on a main circuit board of the display for a multi-function keypad.

FIG. 2 is a plan view illustrating a display panel 130 mounted on a main circuit board 120 of the display 100 (shown in FIGS. 1a and 1b) for a multi-function keypad.

Referring to FIG. 2, the display panel 130 may be mounted on the main circuit board 120. The display panel 130 may be electrically coupled to the main circuit board 120 through the second flexible circuit 133. In addition, the circuit board 140 may be electrically coupled to the main circuit board 120 through the first flexible circuit 124. The display regions 132 formed on the display panel 130 and the openings 142 formed on the circuit board 140 may be formed in positions corresponding to each other.

Figure 3:
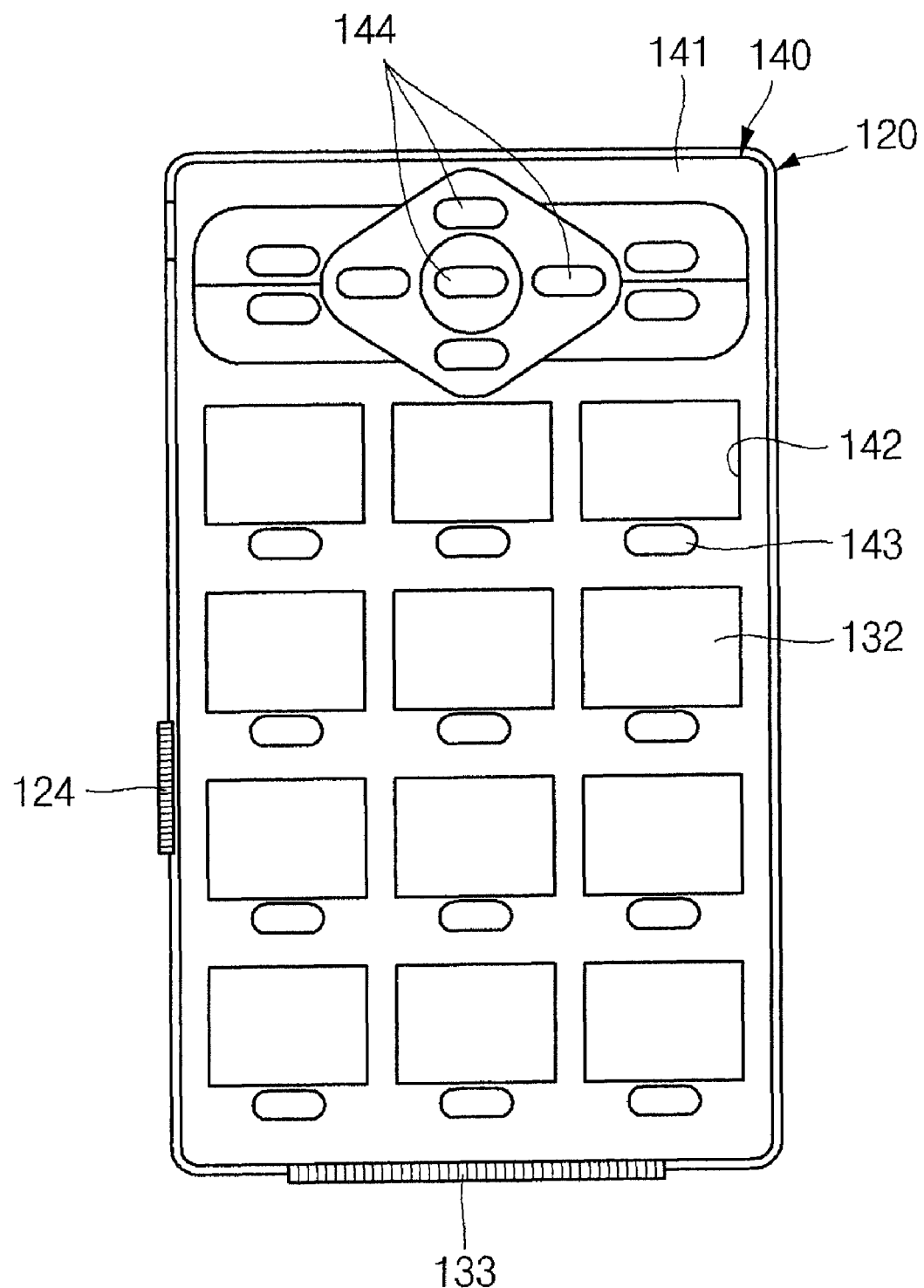
FIG. 3 is a plan view illustrating that the display panel and a circuit board are sequentially mounted on the main circuit board of the display for a multi-function keypad.

FIG. 3 shows a plan view illustrating the display panel 130 and the circuit board 140 that are sequentially mounted on the main circuit board 120 of the display 100 (shown in FIGS. 1a and 1b) for a multi-function keypad.

Referring to FIG. 3, the display panel 130 and the circuit board 140 may be sequentially mounted on the main circuit board 120. Also, the circuit board 140 may be electrically coupled to the main circuit board 120 through the first flexible circuit 124. In addition, the display regions 132 of the display panel 130 can be exposed to the outside through the openings 142 formed on the circuit board 140. Thus, the user can operate the keys 143 and 144 while watching various characters, numbers, specific symbols, still images and moving images displayed on the display regions 132 through the openings 142 formed on the circuit board 140. In addition, the keys 143 may be formed near and outside the peripheral edges of the openings 142 of the circuit board 140.

Figure 4B:
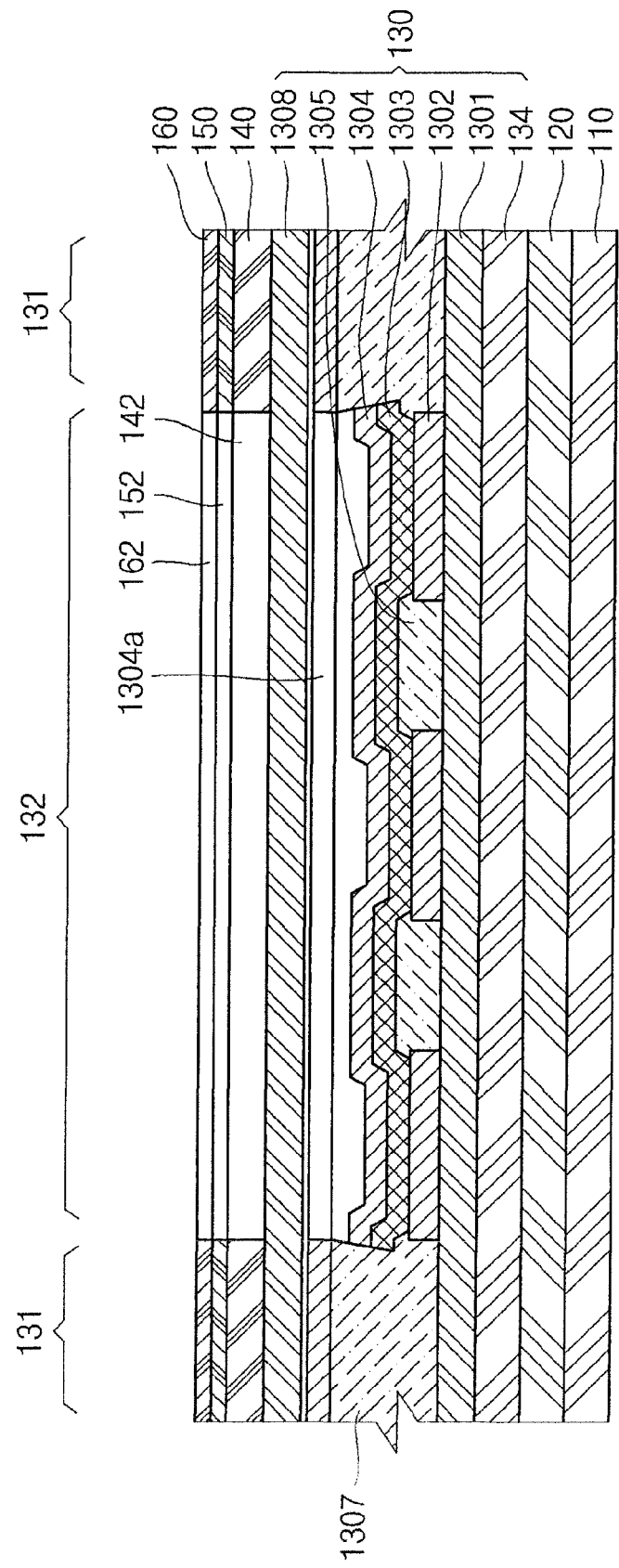

FIG. 4a shows a schematic sectional view taken along the 4a-4a line of FIG. 1a, and FIG. 4b shows a schematic sectional view taken along the 4b-4b line of FIG. 1a.

The display 100 for a multi-function keypad shown in FIGS. 4a and 4b is not exactly proportional to actual size, thickness and length, and is exaggerated or simplified for comprehension of the embodiments of the present invention. For example, three first electrodes 1302, three emitting layers 1303 and three second electrodes 1304 are shown in the display panel 130 of FIGS. 4a and 4b. However, those may be formed in more or less numbers. In addition, the key 143 of FIG. 4a is shown to have a length roughly equal to a length of the emitting layer 1303 or the second electrode 1304, but may be larger or smaller. In addition, the display panel 130 shown in FIGS. 4a and 4b is, for example, a passive matrix organic light emitting display, but the present invention is not limited thereto.

The display panel 130 shown in FIG. 4a includes a first substrate 1301, the first electrodes 1302 formed on the first substrate 1301, the emitting layers 1303 formed on the first electrode 1302, the second electrodes 1304 formed on the emitting layers 1303, an insulation layer 1305 formed between the second electrodes 1304, first separators 1306 formed on the insulation layer 1305, and a second separator 1307 integrally formed near the peripheral edge of the second electrodes 1304 and having a width larger than that of the first separators 1306.

Here, the region provided with the first electrode 1302, the emitting layers 1303, the second electrodes 1304 and the first separators 1306 may be defined as the display region 132. In addition, the region provided with the first electrode 1302, second electrode 1304 and the second separator 1307 without the emitting layers 1303 may be defined as the non-display region 131. Thus, images (e.g., various characters, numbers, specific symbols, still images and moving images) are displayed through the display region 132, but no image is displayed through the non-display region 131. Therefore, most power is consumed by the display region 132, and no power or very little power is consumed by the non-display region 131.

The first substrate 1301 may be any one selected from glass, plastic resin, nano complex, metal, or other equivalents, but the present invention is not limited thereto.

The first electrode 1302 may be formed on a silicon oxide layer, a silicon nitride layer or a silicon oxide nitride layer formed on the first substrate 1301, or may be formed directly on the first substrate 1301. The first electrode 1302 may be formed of any one selected from indium tin oxide (ITO), ITO/Ag, ITO/Ag/ITO, ITO/Ag/IZO (IZO is indium zinc oxide), or other equivalents, but the present invention is not limited thereto.

Furthermore, it is desirable to choose a material having a high work function and a lower hole injection barrier for the emitting layer 1303 as the first electrode 1302. In addition, the first substrate 1301 can include silver (Ag) to reflect light from the emitting layer 1303 toward the upper surface in a top-emission method.

The emitting layer 1303 may be formed on the first electrode 1302. The emitting layer 1303 may emit red, green or blue light, or may emit monochromatic light, but the present invention is not limited thereto. In addition, the emitting layer 1303 may be formed of a hole transport layer (HTL), an organic emitting layer (EML) and an electron transport layer (ETL), where the hole transport layer enables holes to move easily, the organic emitting layer emits light of a desired color by excitons formed by contact of electrons and holes, and the electron transport layer enables electrons to move easily. In addition, an electron injecting layer (EIL) may be further formed in the electron transport layer for improving an electron injection efficiency, and a hole injecting layer (HIL) may be further formed in the hole transport layer for improving a hole injection efficiency, but the present invention is not limited thereto.

The second electrodes 1304 may be formed on the emitting layer 1303 in the direction crossing the first electrode 1302. The first electrode 1302 and second electrode 1304 are not electrically shorted with each other. The second electrode 1304 may be any one selected from Al, LiF, MgAg alloy, MgCa alloy, or other equivalents, but the present invention is not limited thereto. However, when the top-emission method is used, a thickness of the Al type second electrode 1304 should be very thin. As a result, resistance is increased and thus an electron injection barrier may become larger. Thus, it is desirable that any one of LiF, MgAg alloy or MgCa alloy having a lower electron injection barrier is used as the second electrode 1304.

The insulation layer 1305 is formed between the emitting layers 1303 for isolating the emitting layers 1303 physically and electrically from each other. The emitting layers 1303 may be formed of any one selected from polyimide, or other equivalents, but the present invention is not limited thereto.

The first separator 1306 is formed between the second electrodes 1304 (in other words, between the emitting layers 1303) for isolating the second electrodes 1304 physically. The first separator 1306 is formed thicker than the emitting layer 1303, thereby ensuring the physical isolation of the second electrodes 1304 from each other. In addition, the first separator 1306 may be formed in trapezoid shape whose upper edge is longer than the lower edge, but the invention is not limited thereto. In other words, the first separator 1306 may have a trapezoid shape whose lower edge is longer than the upper edge, or a rectangular pillar shape. In addition, the first separator 1306 may be formed by exposure and development of a photoresist, but the present invention is not limited thereto.

The second separator 1307 may be formed near and outside the peripheral edge of the display region 132. In other words, the second separator 1307 may be respectively formed near and outside the peripheral edge of the emitting layer 1303. The second separator 1307 may be formed wider than the first separator 1306. Furthermore, the non-display region 131 may be defined by the second separator 1307. In other words, the region provided with the emitting layer 1303 and first separator 1306 may be defined as the display region 132, and the region provided with the second separator 1307 may be defined as the non-display region 131. On the other hand, additional second electrode 1304a may be further formed on the first separator 1306 and the second separator 1307, but the present invention is not limited thereto.

On the other hand, a transparent second electrode 1308 may be further formed on the first separator 1306 and the second separator 1307 which form the display region 132 and non-display region 131, respectively. The transparent second electrode 1308 may contact the first separator 1306 and the second separator 1307. The transparent second electrode 1308 prevents external moisture and dusts from reaching the emitting layer 1303. The transparent second electrode 1308 is also referred to as a sealing substrate.

The circuit board 140 having the openings 142 and the keys 143 may be placed on the second electrode 1308. According to one embodiment, the openings 142 of the circuit board 140 each have almost the same size as the display regions 132 formed in the display panel 130. In addition, the pad 150 having the transparent window 152 and the pressing unit 153 may be placed on the circuit board 140. According to one embodiment, the transparent window 152 of the pad 150 has almost the same size as the opening 142 formed in the circuit board 140. In addition, the cover 160 having the window 162 may be placed on the pad 150. In this embodiment, the window 162 of the cover 160 has almost the same size as the total size of the transparent window 152 and the pressing unit 153 of the pad 150. In other words, the pressing unit 153 formed on the pad 150 can be exposed to the outside through the window 162 of the cover 160. In addition, at least one of the opening 142, the transparent window 152 and the window 162 may be closed or covered by any one selected from a transparent resin, a transparent glass, or other equivalents for protecting the display regions 132 from the external environment. In some embodiments, the transparent window 152 and the window 162 may be not closed or covered.

As described above, the display panel 130 is divided into the non-display region 131 and the display region 132. The key 143 formed on the circuit board 140 may be located in the region corresponding to the non-display region 131 of the display panel 130. In some embodiments, the key 143 of the circuit board 140 may be formed in the region corresponding to the second separator 1307. The second separator 1307 is thicker than the emitting layer 1303 formed on the display region 132 and wider than the first separator 1306 formed on the display region 132 as described above. Thus, when the key 143 is pressed when the user presses the pressing unit 153 of the pad 150, the second electrode 1308 and the second separator 1307 under the second substrate can absorb, damp and endure the pressure. Therefore, damage or display quality degradation of the display region 132 can be prevented or reduced when the key 143 is operated by the user.

The bezel 134 is placed the display panel 130 that includes the second electrode 1304, and the main circuit board 120 is placed under the bezel 134. The case 110 is placed under the main circuit board 120. These elements have already been explained in the above description, and detailed explanation will be omitted.

Figure 5:
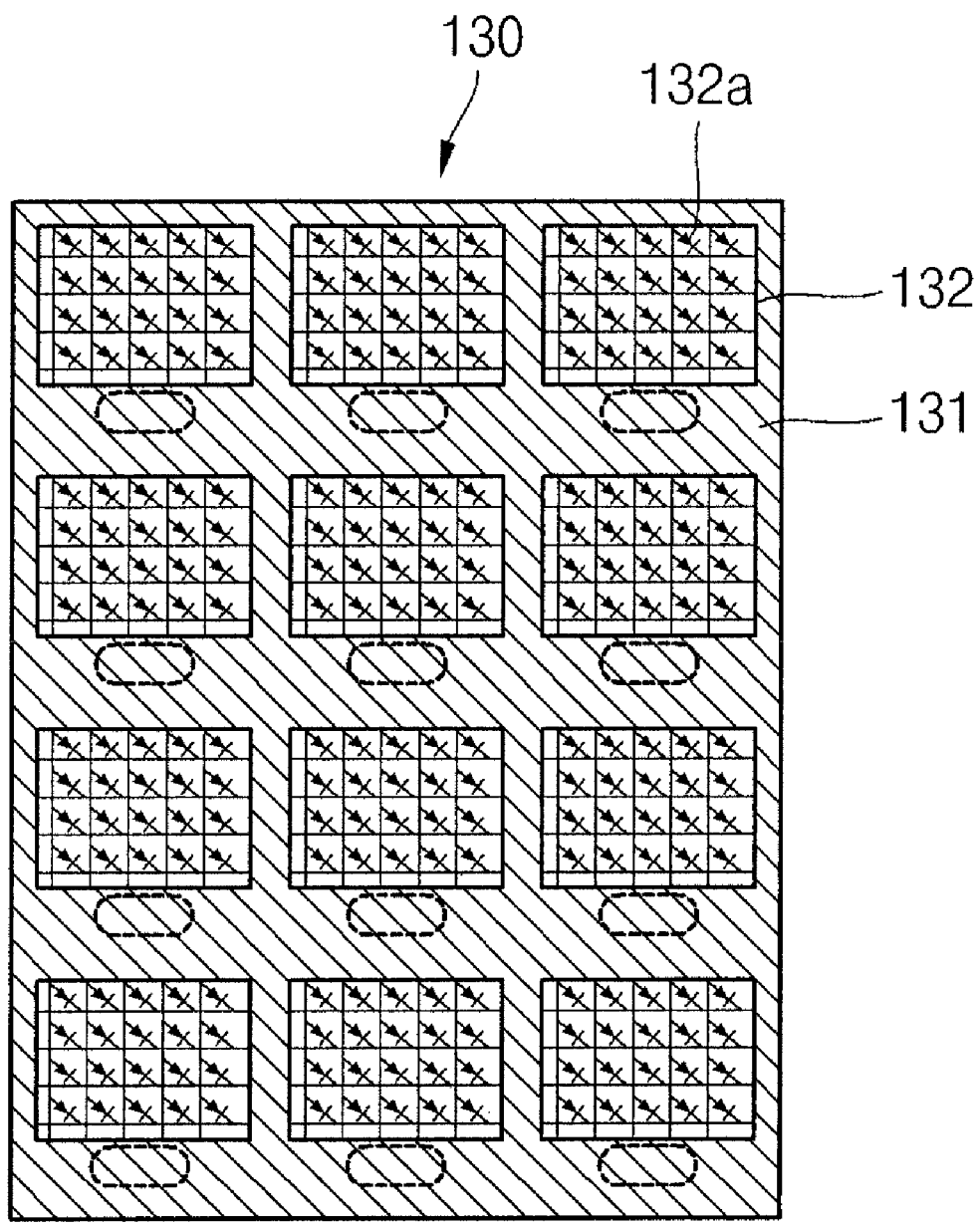
FIG. 5 is a schematic plan view illustrating display regions and a non-display region formed on the display panel of the display for a multi-function keypad.

FIG. 5 shows a schematic plan view illustrating the display regions 132 and the non-display region 131 formed on the display panel 130 of the display 100 for a multi-function keypad.

Referring to FIG. 5, the display panel 130 may be formed of the non-display region 131 displaying nothing and the display regions 132 displaying, for example, characters, numbers, specific symbols, still images and moving images. In some embodiments, the display regions 132 may be formed in a matrix pattern having rows and columns. In FIG. 5, a plurality of pixels 132a are formed in the display regions 132, but no pixel is formed in the non-display region 131.

According to the structure as described above, even when the size of the display panel 130 becomes relatively large, electrode resistance and capacitance of the emitting layer are not significantly increased.

For example, when the total area of the display panel 130 is 20 cm$^2$ (for example, 4 cm*5 cm), and the area of one display region 132 is 1 cm$^2$, and the number of the display region 132 is twelve, the total area of the display region 132 becomes 12 cm$^2$. Thus, power is not consumed in the entire display panel 130 having the area of 20 cm$^2$, but power is consumed in the display regions 132 having the area of 12 cm$^2$. In other words, from a power consumption point of view, the effective display panel is not the whole display panel 130 of roughly 20 cm$^2$, but the total display regions 132 of roughly 12 cm$^2$ in size.

On the other hand, oval shapes in FIG. 5 show regions corresponding to the keys 143 of the circuit board 140. In other words, the keys 143 of the circuit board 140 pressed by the user are located in the regions corresponding to the non-display region 131, not to the display regions 132 of the display panel 130. That is, the regions in the display panel 130 corresponding to the keys 143 of the circuit board 140 are the regions where pixels 132a are not formed.

Figure 6:
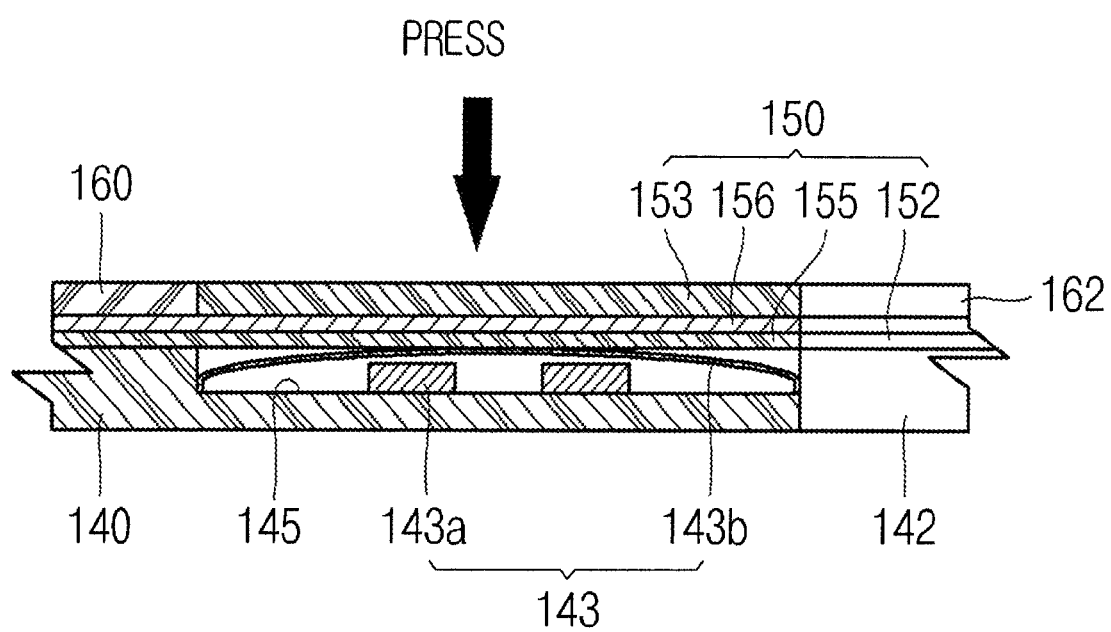
FIG. 6 is a magnified sectional view illustrating a key of the display for a multi-function keypad and a structure around it.

FIG. 6 shows a magnified sectional view illustrating one of the keys 143 and its peripheral structure of the display for a multi-function keypad.

Referring to FIG. 6, the key 143 located in the region corresponding to the non-display region 131 of the display panel 130 may be any one selected from, for example, a dome switch and its equivalents, but the present invention is not limited thereto. That is, the key 143 shown in FIG. 6 is illustrated as an example for comprehension of one embodiment of the present invention, but the present invention is not limited thereto. The key 143 may be formed of at least one conduction pattern 143a formed on the circuit board 140 and an elastic member 143b on the at least one conduction pattern 143a. The elastic member 143b deforms under pressure to make contact with the conduction pattern 143a. In some embodiments, the elastic member 143b may be a conductor, or may include a conduction layer formed on an inner surface of the elastic member 143b. In addition, it is shown in FIG. 6 that a cavity 144 is formed in the region of the circuit board 140 where the key 143 is formed, but the present invention is not limited thereto. In other words, the cavity 144 may not be formed if in some embodiments.

The pad 150 placed on the circuit board 140 may have a multi-layer structure. Likewise, the pad 150 shown in the drawing is just an example for comprehension, but the invention is not limited thereto. The pad 150 may be formed of an insulation layer 155 formed at the lowest layer in contact with the circuit board 140 or the key 143, a thin metal layer 156 formed on the insulation layer 155, and the pressing unit 153 formed in the region corresponding to the key 143 on the upper part of the metal layer 156. The insulation layer 155 enables the pad 150 to be stably and closely contacted with the upper part of the circuit board 140 and key 143, the metal layer 156 provides rigidity to the pad 150, and the pressing unit 153 transmits pressing force of the user to the key 143. The pressing unit 153 may be formed of generally known resin, metal, or other equivalents, but the present invention is not limited thereto. In addition, the pressing unit 153 is projected upward with desirable thickness, thereby allowing the user to press it easily. The cover 160 is mounted on the pad 150, and the upper part of the pressing unit 153 of the pad 150 is exposed through the window 162 formed in the cover 160. Here, the thickness of the pressing unit 153 may be controlled so as to be projected or not to be projected out of the pad 150.

Figure 7:
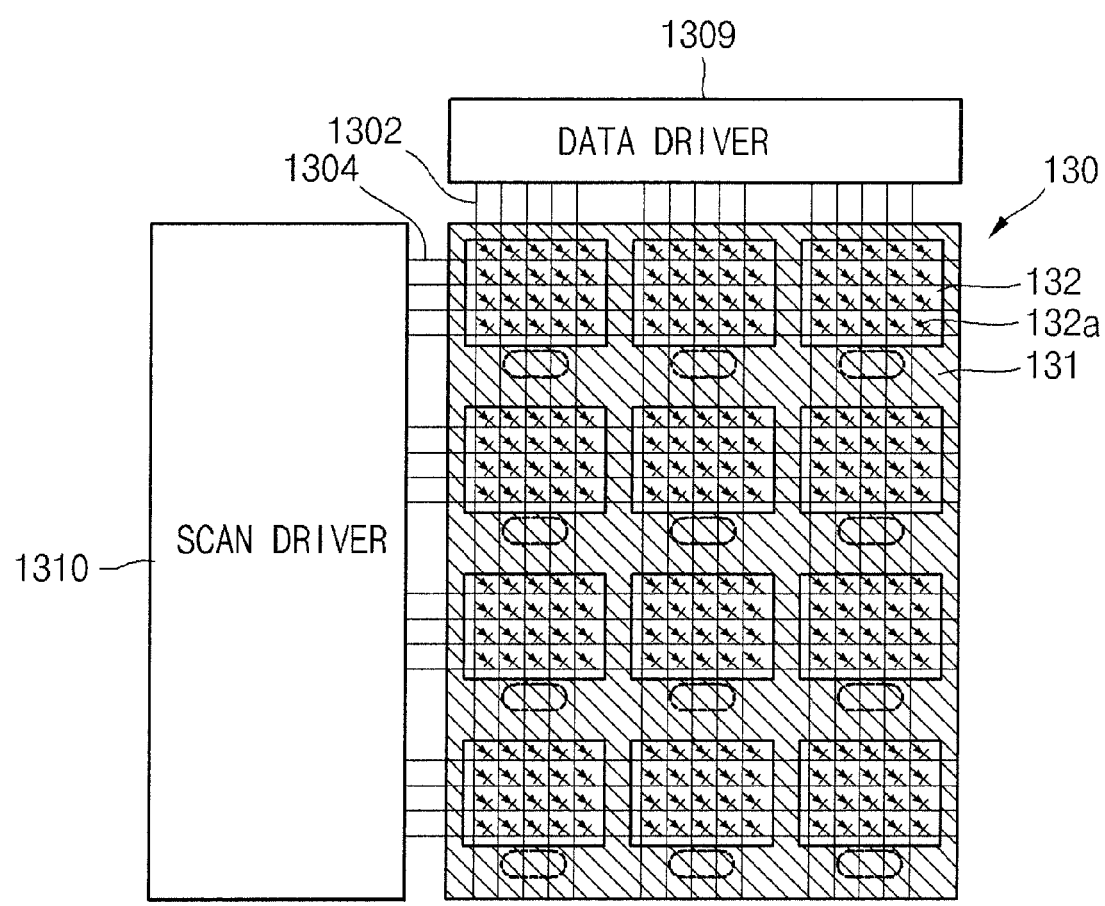
FIG. 7 is a schematic view illustrating an electrical construction of the display panel of the display for a multi-function keypad.

FIG. 7 shows a schematic view illustrating an electrical construction of the display panel 130 of the display 100 for a multi-function keypad.

Referring to FIG. 7, the display panel 130 is formed of the non-display region 131 and a plurality of display regions 132. A plurality of pixels 132a may be formed in the display regions 132. In addition, a plurality of first electrodes 1302 and a plurality of second electrodes 1304 may be formed in the display regions 132. In addition, for example, a data driver 1309 may be electrically coupled to the first electrodes 1302 for applying a data signal to the display regions 132, and a scan driver 1310 may be electrically coupled to the second electrodes 1304 for applying a scan signal to the display regions 132. The data driver 1309 may be referred to as a source driver or a column driver, and the scan driver 1310 may be referred to as a gate driver or a row driver.

As described above, the pixels 132a are not formed on the entire display panel 130. In other words, the pixels 132a are formed only at the selected display regions 132. Thus, the above described display panel 130 has lower power consumption and improved manufacturing yield in comparison to cases where the display regions 132 or the pixels 132a are formed on the entire display panel 130, and thus manufacturing cost is reduced.

Oval regions shown in the drawing are regions corresponding to the keys 143 formed on the circuit board 140. As shown in the drawing, the keys 143 are located at regions corresponding to the non-display region 131 of the display panel 130, thereby reducing or preventing damage or display quality degradation of the display regions 132 when the keys 143 are operated.

Figure 8:
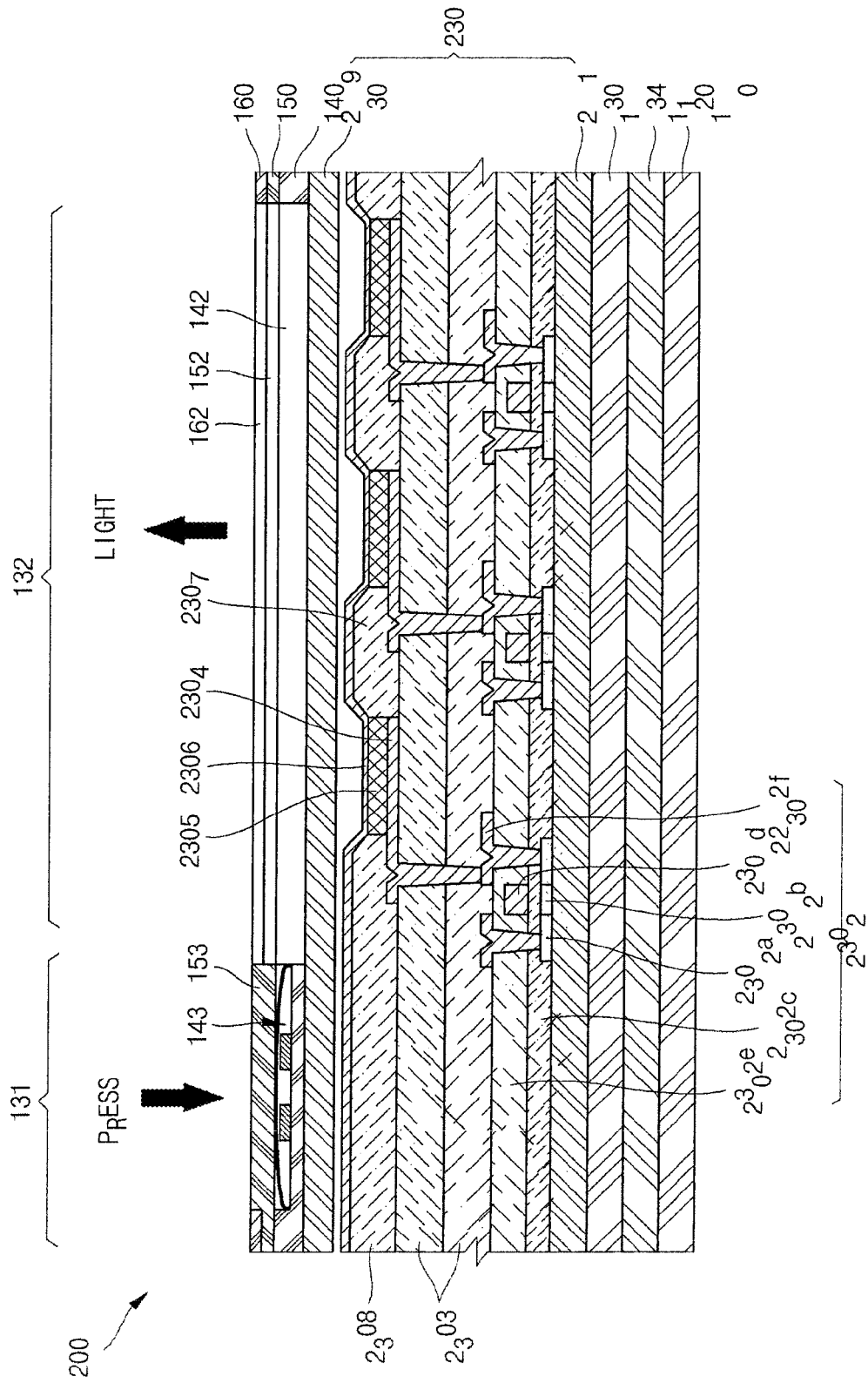
FIG. 8 is a schematic sectional view illustrating a display for a multi-function keypad according to another exemplary embodiment of the present invention.

FIG. 8 is a schematic sectional view illustrating a display 200 for a multi-function keypad according to another exemplary embodiment of the present invention.

The display 200 for a multi-function keypad shown in FIG. 8 is not exactly proportional to actual size, thickness and length, and is exaggerated or simplified for comprehension of one embodiment of the present invention (e.g., a capacitor is omitted in the drawing). For example, three transistors 2302, three first electrodes 2304, three emitting layers 2305 and one second electrode 2306 are shown in FIG. 8. However, those may be formed in much more or less numbers in practice. In addition, a key 143 of a circuit board 140 shown in FIG. 8 is shown to have a length similar to a length of the first electrode 2304 or the emitting layer 2305, but may be actually much larger or smaller. In addition, the display panel 230 shown in FIG. 8 is an active matrix organic light emitting display, but the present invention is not limited thereto.

Referring to FIG. 8, the display panel 230 includes a first substrate 2301, the transistors 2302 formed on the first substrate 2301, the insulation layers 2303 formed on the transistors 2302, the first electrodes 2304 electrically coupled to the transistors 2302, the emitting layers 2305 formed on the first electrodes 2304, the second electrode 2306 formed on the emitting layers 2305, first pixel definition layers 2307 defining each pixel, and a second pixel definition layer 2308 formed on the outer periphery of the first pixel definition layer 2307.

Here, the region provided with the three first electrodes 2304, three emitting layers 2305, one second electrode 2306 and three first pixel definition layers 2307 may be defined as the display region 132, and the region provided with only the second pixel definition layer 2308 without the emitting layers 2305 may be defined as the non-display region 131.

The first substrate 2301 may be any one selected from glass, plastic resin, nano complex, metal, or other equivalents, but the present invention is not limited thereto.

The transistors 2302 may be formed on a silicon oxide layer, a silicon nitride layer or a silicon oxide nitride layer formed on the first substrate 2301, or the transistors 2302 may be formed directly on the first substrate 2301. The transistors 2302 may be thin film transistors, and each have a source/drain region 2302a and a channel region 2302b. A gate insulation layer 2302c may be formed on the surface of the transistor 2302, and a gate electrode 2302d may be formed in the region corresponding to the channel region 2302b. In addition, a dielectric layer 2302e may be formed to cover the gate electrode 2302d, and a source/drain electrode 2302f electrically coupled to the source/drain region 2302a may be formed on the dielectric layer 2302e. Here, the structure of the transistors 2302 may be any suitable one selected from all conventional structures of the thin film transistor, for example, an inverted coplanar structure, a staggered structure, an inverted staggered structure, or other equivalents, but the present invention is not limited thereto.

The insulation layers 2303 may be formed on the surface of the transistors 2302. The insulation layers 2303 prevent moisture from permeating into the transistors 2302 and planarizes the surface. The insulation layers 2303 may be any one selected from an organic layer, an inorganic layer, or other equivalents or mixture thereof, but the invention is not limited thereto.

The first electrodes 2304 may be formed on the insulation layers 2303 and may be electrically coupled to the corresponding source/drain electrodes 2302f of the transistors 2302. The first electrodes 2304 may be formed of any one selected from ITO, ITO/Ag, ITO/Ag/ITO, ITO/Ag/IZO, or other equivalents, but the present invention is not limited thereto. The first electrodes 2304 have been explained in the above description, and thus detailed explanation will be omitted.

The emitting layer 2305 may be formed on the first electrode 2304. Actually, the emitting layer 2305 may be formed of a hole transport layer, an organic emitting layer and an electron transport layer. The emitting layer 2305 has been explained in the above description, and thus detailed explanation will be omitted.

The second electrode 2306 may be formed on the emitting layer 2305. The second electrode 2306 may be any one selected from Al, LiF, MgAg alloy, MgCa alloy, or other equivalents, but the present invention is not limited thereto. The second electrode 2306 has been explained in the above description, and thus detailed explanation will be omitted.

The first pixel definition layer 2307 is formed between the emitting layers 2305 for isolating the emitting layers 2305 physically and electrically from each other. The first pixel definition layer 2307 is formed thicker than the emitting layer 2305, thereby ensuring the emitting layers 2305 to be physically and electrically isolated from each other. In addition, the first pixel definition layer 2307 may be formed in a trapezoid shape whose upper edge is longer than the lower edge, but the present invention is not limited thereto. In addition, the first pixel definition layer 2307 may be formed by exposure and development of polyimide, but the present invention is not limited thereto.

The second pixel definition layer 2308 may be formed near and outside the peripheral edge of the emitting layers 2305 that form the display region 132. The second pixel definition layer 2308 may be formed wider than the first pixel definition layer 2307. The non-display region 131 is defined by the second pixel definition layer 2308. In other words, the first electrodes 2304, the emitting layers 2305 and the first pixel definition layers 2307 may be defined as the display region 132, and the second pixel definition layer 2308 may be defined as the non-display region 131. Alternatively, the second electrode 2306 may be a common electrode formed on the first pixel definition layer 2307 and the second pixel definition layer 2308, but the present invention is not limited thereto.

A transparent second substrate 2309 may be further formed on the first pixel definition layer 2307 and the second pixel definition layer 2308 which are included in the display region 132 and the non-display region 131, respectively. The transparent second substrate 2309 may be in contact with the first pixel definition layer 2307 and the second pixel definition layer 2308. The second substrate 2309 prevents or reduces external moisture and dusts from reaching the emitting layers 2305.

The circuit board 140 having the opening 142 and the key 143 may be placed on the transparent second substrate 2309, the pad 150 having the transparent window 152 and the pressing unit 153 may be placed on the circuit board 140, and the cover 160 may be placed on the pad 150. This structure has been explained in the above description, and thus detailed explanation will be omitted.

As described above, the display panel 230 is divided into the non-display region 131 and the display region 132. The key 143 formed on the circuit board 140 is located in the region corresponding to the non-display region 131 of the display panel 230. The key 143 of the circuit board 140 may be formed in the region corresponding to the second pixel definition layer 2308. The second pixel definition layer 2308 is thicker than the emitting layers 2305 formed on the display region 132, and wider than the first pixel definition layers 2307 formed on the display region 132 as described above. Thus, when the key 143 is pressed by the user by pressing the pressing unit 153 of the pad 150, the second substrate 2309 and the second pixel definition layer 2308 under the second substrate 2309 can sufficiently absorb, damp and endure the pressure. Therefore, damage or display quality degradation of the display region 132 can be prevented or reduced even if a user presses the key 143 with excessive force.

The bezel 134 is placed under the first substrate 2301 of the display panel 230, and the main circuit board 120 is placed under the bezel 134, and a reference numeral 110 indicates a case placed under the main circuit board 120.

Figure 9:
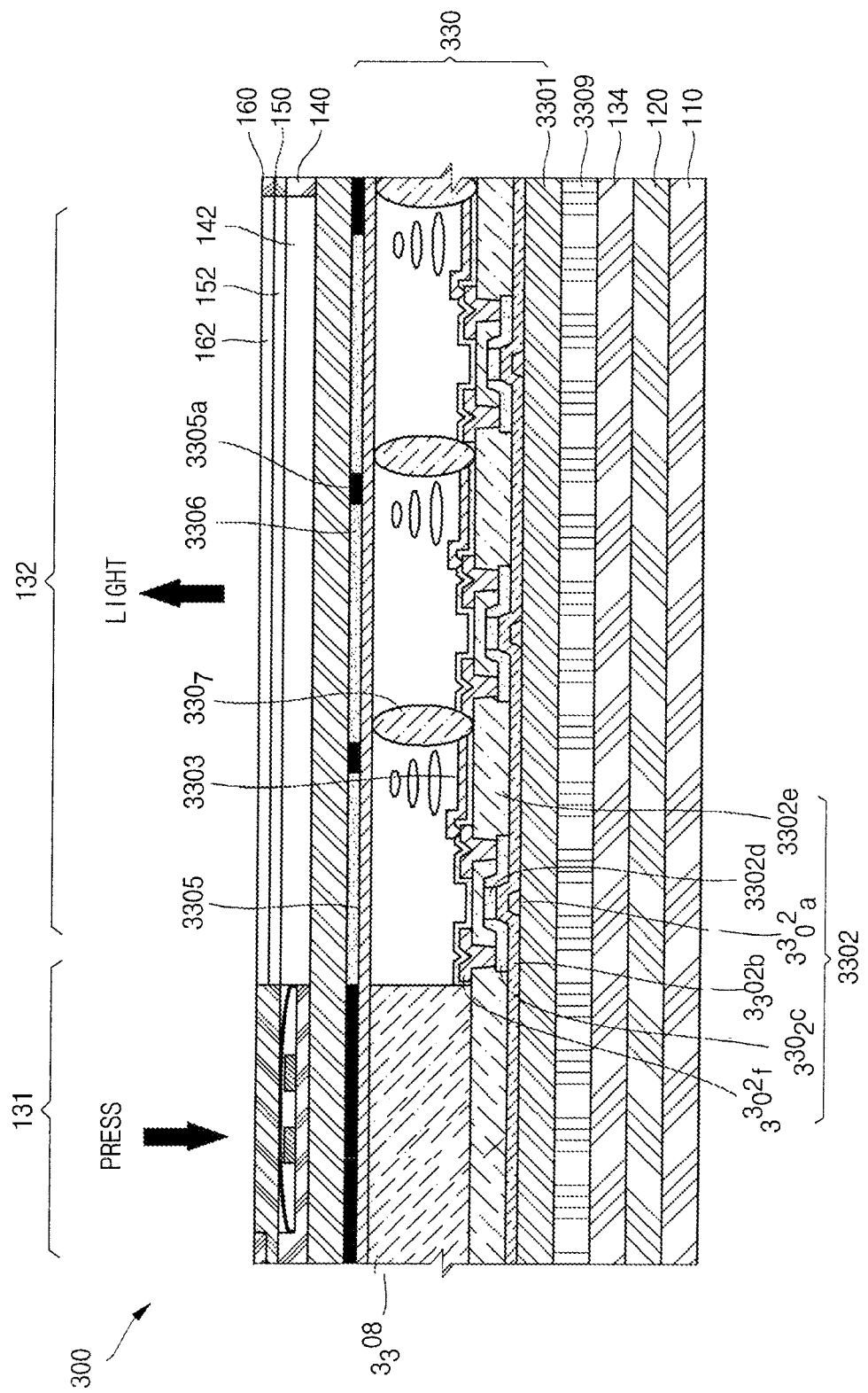
FIG. 9 is a schematic sectional view illustrating a display for a multi-function keypad according to a still another exemplary embodiment of the present invention.

FIG. 9 is a schematic sectional view illustrating a display 300 for a multi-function keypad according to a still another exemplary embodiment of the present invention.

The display 300 for a multi-function keypad shown in FIG. 9 is not exactly proportional to actual size, thickness and length, and is exaggerated or simplified for comprehension of an embodiment of the present invention (e.g., a capacitor is omitted). For example, three transistors 3302, three first electrodes 3303, three liquid crystal units 3304 and one second electrode 3305 are shown in FIG. 9. However, those may be formed in more or less numbers. In addition, a width of the key 143 of the circuit board 140 shown in FIG. 9 is similar to that of one of the color filters 3306, but it may be larger or smaller in practice. In addition, a display panel 330 shown in FIG. 9 is a liquid crystal display, but the present invention is not limited thereto.

Referring to FIG. 9, the display panel 330 includes a first substrate 3301, the three transistors 3302 formed on the first substrate 3301, the three first electrodes 3303 each electrically coupled to a corresponding one of the three transistors 3302, the three liquid crystal units 3304 each formed on a corresponding one of the first electrodes 3303, the second electrode 3305 formed on the liquid crystal units 3304, the color filters 3306 placed on the second electrode 3305, three first spacers 3307 each defining a pixel, and a second spacer 3308 formed on the outer periphery of the first spacers 3307. Here, the region provided with the three transistors 3302, the three first electrodes 3303, the three liquid crystal units 3304, the second electrode 3305, the three color filters 3306 and the three first spacers 3307 may be defined as the display region 132, and the region provided with the second spacer 3308 may be defined as the non-display region 131.

The first substrate 3301 may be any one selected from glass, plastic resin, nano complex, metal, or other equivalents, but the present invention is not limited thereto.

The transistor 3302 may be formed on a silicon oxide layer, a silicon nitride layer or a silicon oxide nitride layer formed on the first substrate 3301, or may be formed directly on the first substrate 3301. For example, a gate electrode 3302a may be formed on the surface of the first substrate 3301, and a gate insulation layer 3302b may be formed on the surface of the gate electrode. A source/drain region 3302c and a channel region 3302d may be formed on the gate insulation layer 3302b. In addition, an insulation layer 3302e may be formed on the surfaces of the source/drain region 3302c and the channel region 3302d. In addition, a source/drain electrode 3302f may be electrically coupled to the source/drain region 3302c on the insulation layer (e.g., a dielectric layer) 3302e. The transistor 3302 may be a thin film transistor of various structures, but the present invention is not limited thereto.

The first electrode 3303 may be electrically coupled to the source/drain electrode 3302f of the transistor 3302. The first electrode 3303 may be formed of any one selected from ITO, ITO/Ag, ITO/Ag/ITO, ITO/Ag/IZO, or other equivalents, but the present invention is not limited thereto. The first electrode 3303 has been explained in the above description. Thus, the detailed explanation will be omitted.

The liquid crystal unit 3304 may be formed on the first electrode 3303. The crystallization direction of the liquid crystal unit 3304 is changed according to a magnitude of electric field formed between the first electrode 3303 and the second electrode 3305, thereby allowing a light transmittance of a backlight applied the liquid crystal unit 3304 to be changed.

The second electrode 3305 may be formed on the upper region of the display panel 330 and facing the first electrodes 3303. The second electrode 3305 is connected to all pixels in common. The second electrode 3305 may be formed of any one selected from ITO, ITO/Ag, ITO/Ag/ITO, ITO/Ag/IZO, or other equivalents, but the present invention is not limited thereto. The second electrode 3305 has been explained in the above description, and thus detailed explanation will be omitted.

The color filters 3306 may be formed on the second electrode 3305. The color filters 3306 filter the light transmitted from the backlight to transmit red, green or blue light to the outside. Also, a black matrix second electrode 3305a may be formed between the color filters 3306 so as to divide light into red, green and blue light.

The first spacers 3307 are placed between the first substrate 3301 and the second electrode 3305 for keeping a proper distance therebetween.

The second spacer 3308 may be formed on the first substrate near the outermost first spacer 3307. The second spacer 3308 may be formed wider than the first spacer 3307. In other words, the region formed by a plurality of the first spacers 3307 may be the display region 132, and the region formed by the second spacer 3308 may be the non-display region 131.

A transparent second substrate 3309 may be formed on the first spacers 3307 and the second spacer 3308 which respectively form the display region 132 and the non-display region 131. The transparent second substrate 3309 may be in contact with the first spacers 3307 and the second spacer 3308. The second substrate 3309 can prevent or reduce external moisture and dusts from reaching the liquid crystal unit 3304.

The circuit board 140 having the opening 142 and key 143 is placed on the transparent second substrate 3309, the pad 150 having the transparent window 152 and pressing unit 153 is placed on the circuit board 140, and a cover 160 is placed on the pad 150.

As described above, the display panel 330 includes the non-display region 131 and the display region 132. The key 143 formed on the circuit board 140 is located in the region corresponding to the non-display region 131 of the display panel 330. The key 143 of the circuit board 140 may be formed on the second spacer 3308. The second spacer 3308 is formed wider than the first spacer 3307 formed in the display region 132 as described above. Thus, when the user presses the key 143 by pressing the pressing unit 153 of the pad 150, the second substrate 3309 and the second spacer 3308 under the second substrate 3309 can sufficiently absorb, damp and endure the pressure applied. Therefore, damage or display quality degradation of the display region 132 can be reduced or prevented when the user presses the key 143 with excessive force.

The backlight 3310 is placed under the first substrate 3301 that forms the display panel 330, and the bezel 134 is placed under the back light 3310. The main circuit board 120 is placed under the bezel 134, and the case 110 is placed under the main circuit board 120.

Figure 10A:
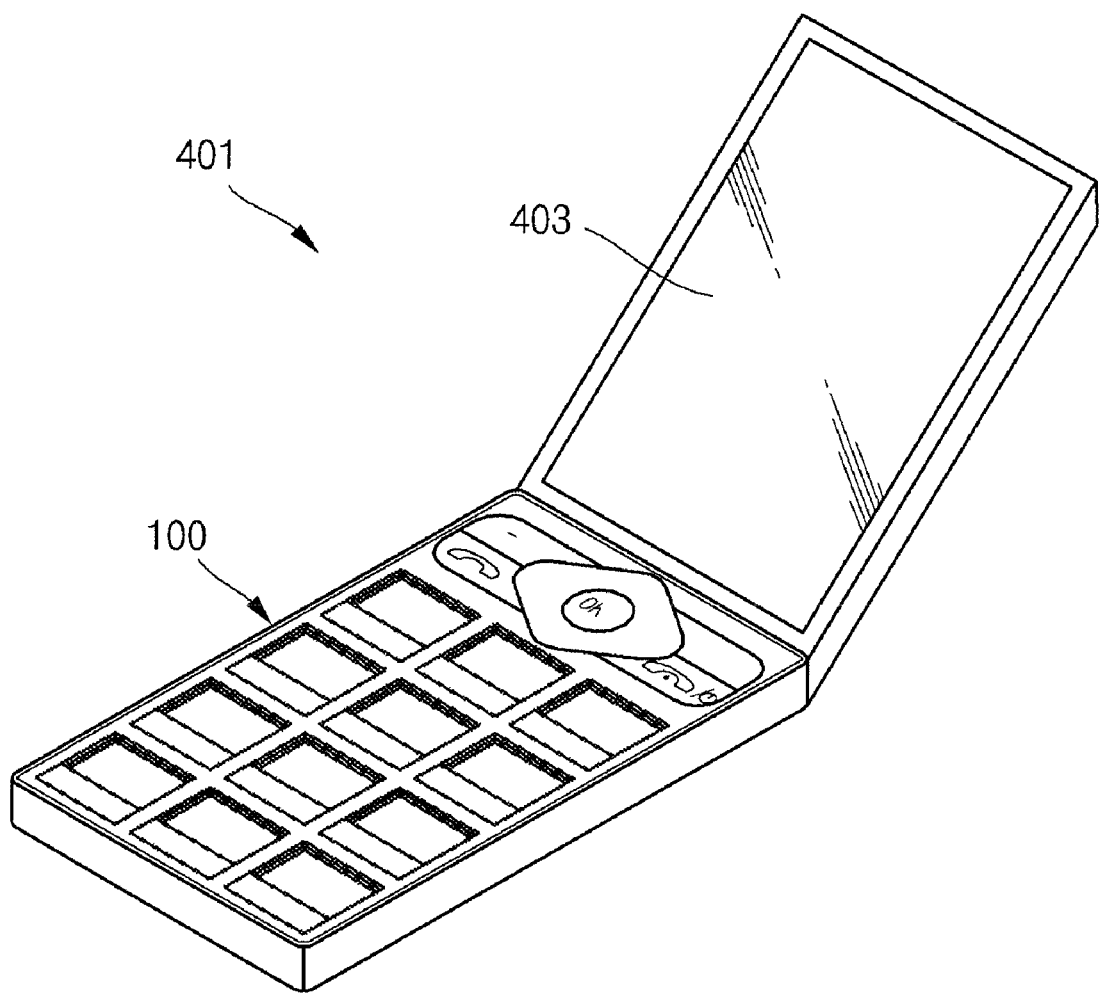
FIGS. 10a and 10b are schematic perspective views illustrating examples of an electronic device having the display for a multi-function keypad.
Figure 10B:
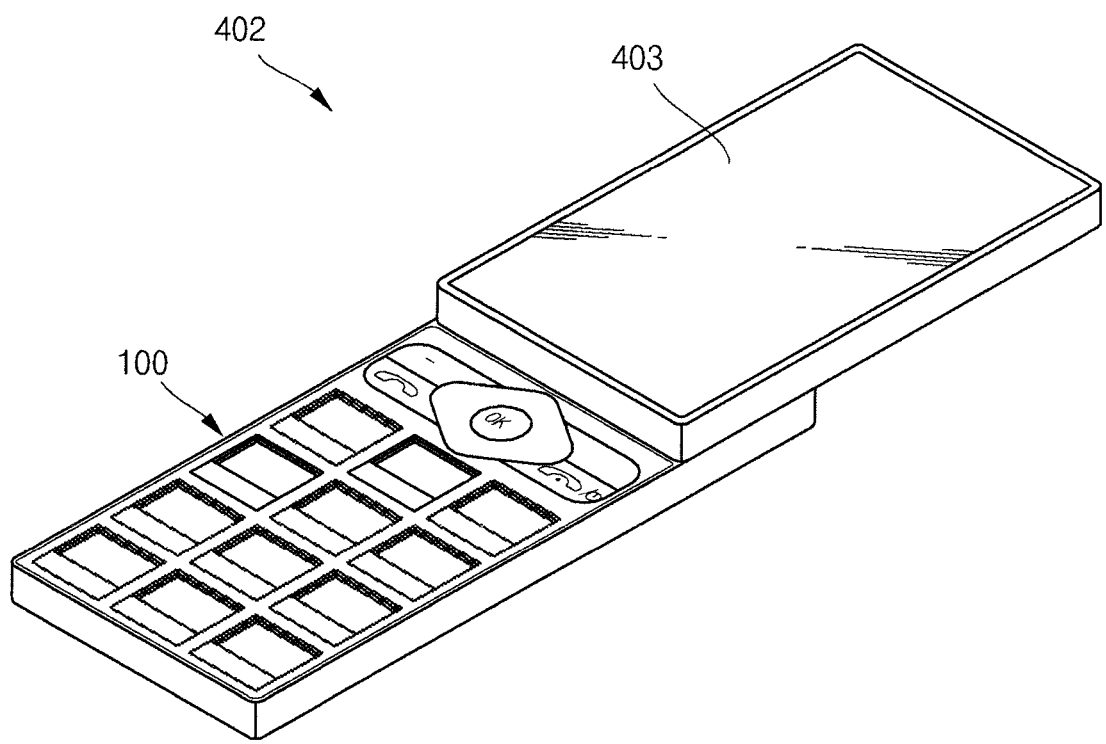
Figure 8:
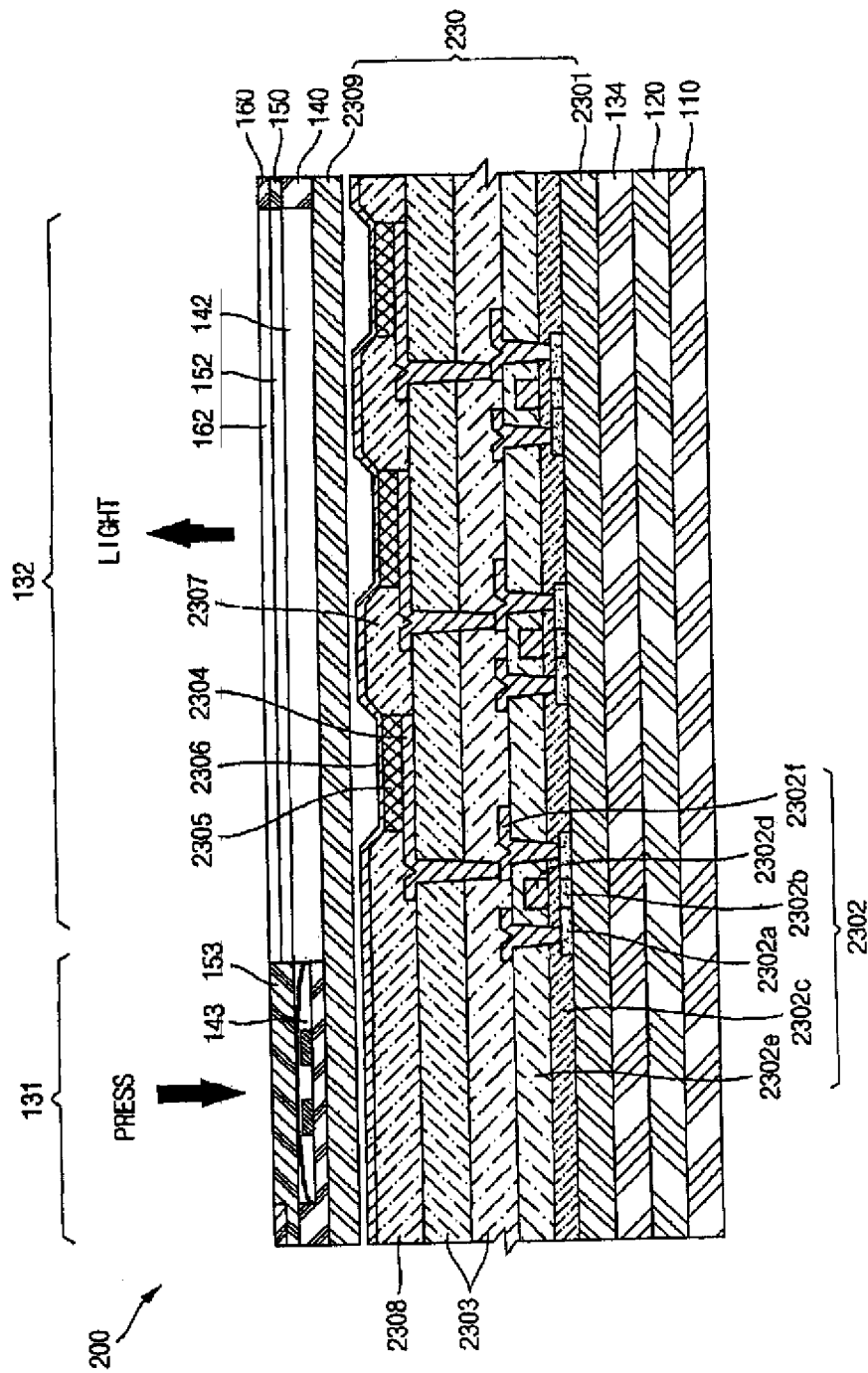

FIGS. 10a and 10b are perspective views illustrating examples of electronic devices 401 and 402 having the display for a multi-function keypad.

Referring to FIGS. 10a and 10b, the display 100 (or, the displays 200 or 300) for the multi-function keypad can be used in electronic devices 401 and 402 as a main display panel 403.

More particularly, as shown in FIG. 10a, the electronic device 401 may be a folder type mobile phone. The electronic device 401 includes a display panel 130 of the display for a multi-function keypad in addition to the main display panel 403. Thus, the electronic device 401 has a total of two display panels. In addition, as shown in FIG. 10b, the electronic device 402 may be a slide type mobile phone. The electronic device 402 also includes a display panel 130 of the display for a multi-function keypad in addition to the main display panel 403, and thus has a total of two display panels.

In addition, the exemplary displays described above (e.g., display 100, 200 or 300) for a multi-function keypad can be used in various electronic devices such as a MP3 player, a car audio, an auto console, a PDA and other industrial displays, but the invention is not limited thereto.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

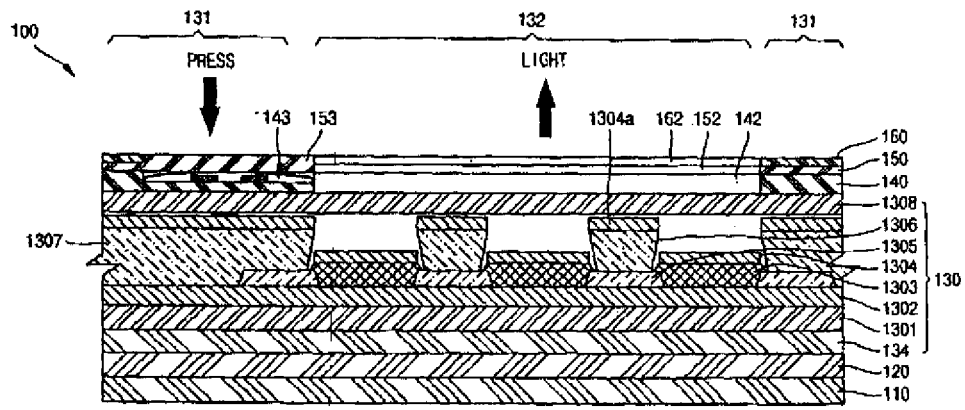

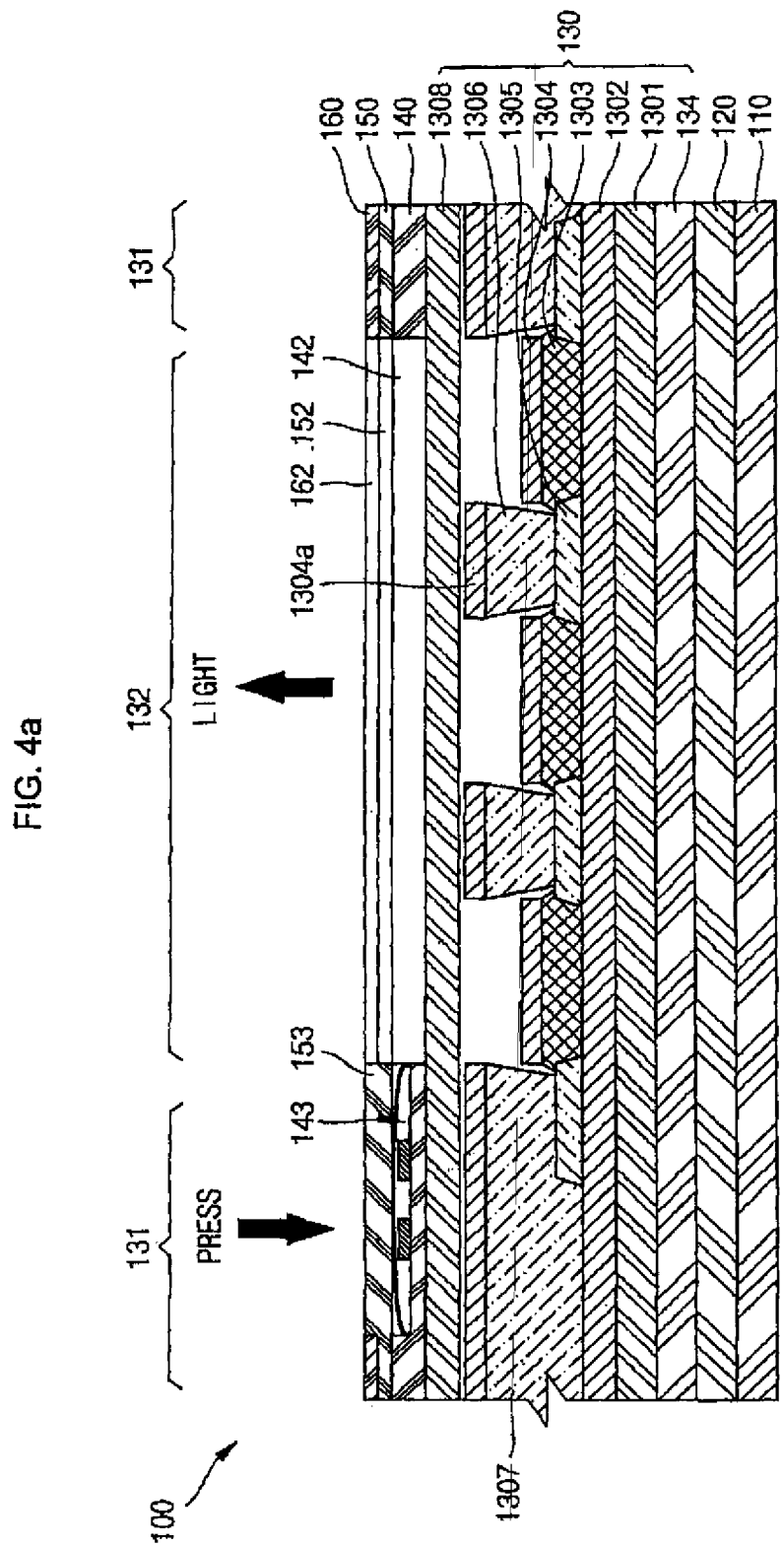

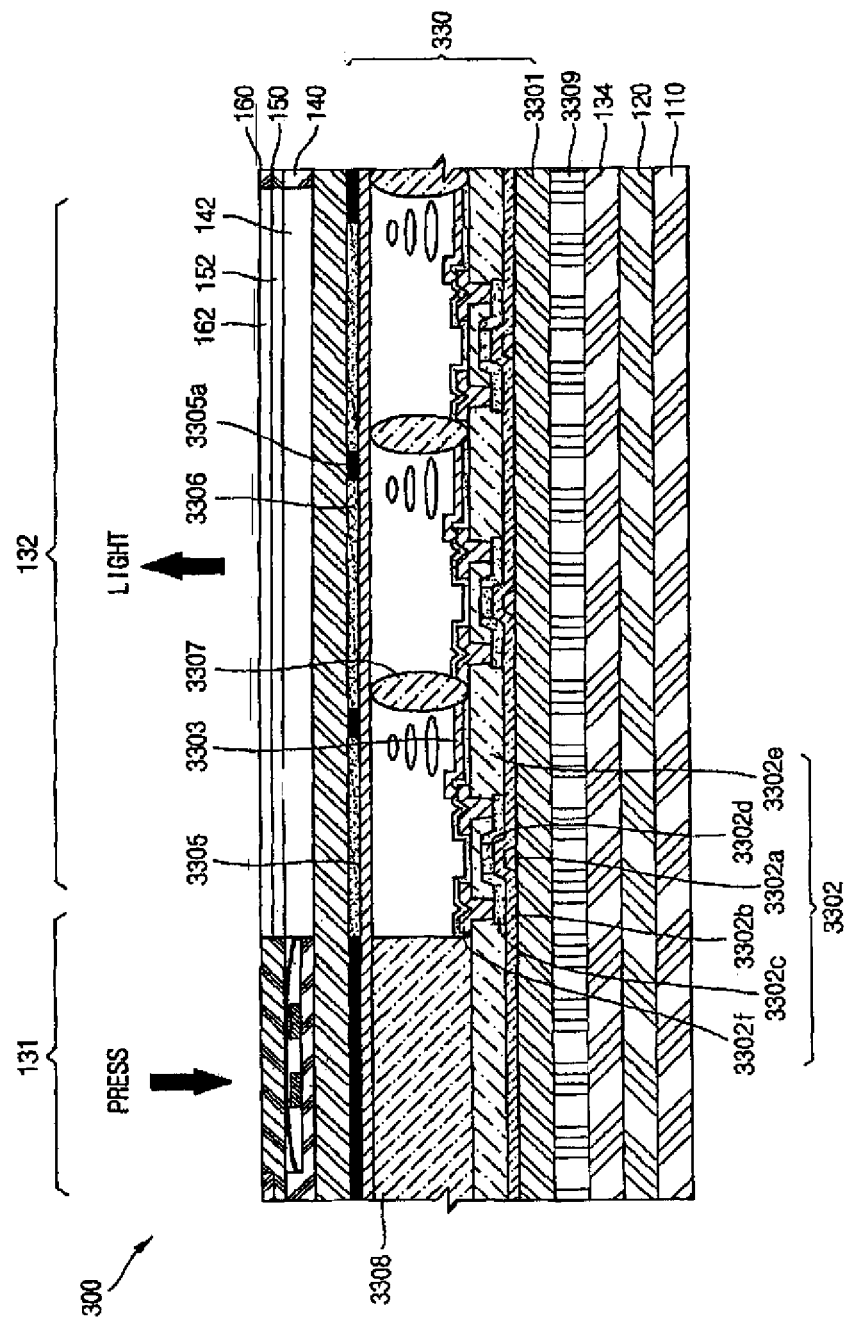

What is claimed is:

1. A display for a multi-function keypad, comprising:
   a display panel comprising:
   a plurality of display regions each comprising at least one pixel and arranged in a matrix pattern; and
   a non-display region surrounding the plurality of display regions, the non-display region having no pixels formed therein;
   a circuit board on the display panel, the circuit board comprising a plurality of openings corresponding to the plurality of display regions, and a plurality of keys at regions of the circuit board near peripheral edges of the plurality of openings, the regions of the circuit board corresponding to the non-display region; and
   a pad on the circuit board, the pad comprising a plurality of transparent windows corresponding to the plurality of openings, and a plurality of pressing units at regions of the pad near peripheral edges of the transparent windows, the regions of the pad corresponding to the plurality of keys,
   wherein each of the plurality of display regions further comprises at least one first separator, and
   wherein the non-display region comprises at least one second separator wider than the at least one first separator, the at least one second separator being at a region of the non-display region, the second separator being aligned with a key of the plurality of keys of the circuit board in a direction in which the key is configured to be pressed.

2. The display of claim 1, wherein the plurality of display regions each comprise a plurality of pixels.

3. The display of claim 1, wherein the display panel comprises a data driver for applying a data signal to the plurality of display regions, and a scan driver for applying a scan signal to the plurality of display regions.

4. The display of claim 1, wherein the display panel comprises a passive matrix organic light emitting display.

5. The display of claim 1, wherein each of the plurality of display regions comprises:
   at least one first electrode extending in a first direction;
   at least one second electrode extending in a second direction crossing the at least one first electrode; and
   at least one emitting layer at a crossing region between the at least one first electrode and the at least one second electrode, wherein the at least one emitting layer, the at least one first electrode and the at least one second electrode define a pixel.

6. The display of claim 1, wherein the display panel comprises an active matrix organic light emitting display.

7. The display of claim 1, wherein each of the plurality of display regions comprises:
   at least one first electrode extending in a first direction;
   at least one second electrode extending in a second direction crossing the at least one first electrode;
   at least one emitting layer; and
   at least one transistor coupled to the at least one first electrode,
   wherein the at least one emitting layer is at a crossing region between the at least one first electrode and the at least one second electrode, and the at least one emitting layer, the at least one first electrode, the at least one second electrode and the at least one transistor define a pixel.

8. The display of claim 1, wherein the display panel comprises a liquid crystal display panel having at least one pixel in each of the plurality of display regions.

9. The display of claim 1, wherein each of the plurality of display regions comprises:
   at least one first electrode extending in a first direction;
   at least one second electrode extending in a second direction crossing the at least one first electrode and comprising at least one color filter; and
   at least one liquid crystal unit coupled to the at least one first electrode and the at least one second electrode,
   wherein the at least one liquid crystal unit, the at least one first electrode, the at least one second electrode and the at least one color filter define a pixel.

10. The display of claim 9, wherein each of the plurality of display regions further comprises at least one first spacer between two adjacent liquid crystal units, and
   wherein the non-display region comprises at least one second spacer that is wider than the at least one first spacer, the at least one second spacer being in region of the non-display region corresponding to the plurality of keys of the circuit board.

11. The display of claim 10, further comprising a transparent substrate on the at least one first spacer and the at least one second spacer,
   wherein the plurality of keys of the circuit board are located on regions of the transparent substrate corresponding to the at least one second spacer.

12. The display of claim 1, wherein each of the plurality of keys of the circuit board comprises a dome switch.

13. The display of claim 1, wherein each of the plurality of keys comprises:
   a conduction pattern in a region of the circuit board corresponding to the non-display region; and
   an elastic member on the conduction pattern,
   wherein the elastic member is configured to deform under pressure, thereby making contact with the conduction pattern.

14. The display of claim 1, wherein the pad comprises an insulation layer, a metal layer on the insulation layer, and at least one pressing unit on at least one region of the metal layer corresponding to the plurality of keys.

15. The display of claim 14, wherein the at least one pressing unit projects toward a direction away from the metal layer.

16. The display of claim 1, further comprising a main circuit board on one side of the display panel opposite to another side of the display panel where the circuit board is located,
   wherein the main circuit board is electrically coupled to the display panel and the circuit board.

17. The display of claim 1, further comprising a cover on the pad for securing the pad.

18. The display of claim 1, wherein the display regions and the non-display region are on a same substrate.

19. A display for a multi-function keypad, comprising:
   a display panel comprising:
      a plurality of display regions arranged in a matrix pattern; and
      a non-display region surrounding the plurality of display regions;
   a circuit board on the display panel, the circuit board comprising a plurality of openings corresponding to the plurality of display regions, and a plurality of keys at regions of the circuit board near peripheral edges of the plurality of openings, the regions of the circuit board corresponding to the non-display region; and
   a pad on the circuit board, the pad comprising a plurality of transparent windows corresponding to the plurality of openings, and a plurality of pressing units at regions of the pad near peripheral edges of the transparent windows, the regions of the pad corresponding to the plurality of keys,
   wherein each of the plurality of display regions comprises:
      at least one first electrode extending in a first direction;
      at least one second electrode extending in a second direction crossing the at least one first electrode; and
      at least one emitting layer at a crossing region between the at least one first electrode and the at least one second electrode,
   wherein the at least one emitting layer, the at least one first electrode, and the at least one second electrode define a pixel,
   wherein each of the plurality of display regions further comprises at least one first separator thicker than two adjacent emitting layers, and
   wherein the non-display region comprises at least one second separator wider than the at least one first separator, the at least one second separator being at a region of the non-display region corresponding to a key of the plurality of keys of the circuit board.

20. The display of claim 19, further comprising a transparent substrate on the at least one first separator and the at least one second separator,
   wherein the plurality of keys of the circuit board are on regions of the transparent substrate corresponding to the at least one second separator.

21. A display for a multi-function keypad, comprising:
   a display panel comprising:
      a plurality of display regions arranged in a matrix pattern; and
      a non-display region surrounding the plurality of display regions;
   a circuit board on the display panel, the circuit board comprising a plurality of openings corresponding to the plurality of display regions, and a plurality of keys at regions of the circuit board near peripheral edges of the plurality of openings, the regions of the circuit board corresponding to the non-display region; and
   a pad on the circuit board, the pad comprising a plurality of transparent windows corresponding to the plurality of openings, and a plurality of pressing units at regions of the pad near peripheral edges of the transparent windows, the regions of the pad corresponding to the plurality of keys, wherein each of the plurality of display regions comprises:
- at least one first electrode extending in a first direction;
- at least one second electrode extending in a second direction crossing the at least one first electrode;
- at least one emitting layer at a crossing region between the at least one first electrode and the at least one second electrode; and
- at least one transistor coupled to the at least one first electrode, wherein the at least one emitting layer, the at least one first electrode, the at least one second electrode, and the at least one transistor define a pixel, wherein each of the plurality of display regions further comprises at least one first pixel definition layer thicker than two adjacent emitting layers, wherein the non-display region comprises at least one second pixel definition layer that is wider than the at least one first pixel definition layer, and wherein the plurality of keys of the circuit board are at regions of the circuit board corresponding to the at least one second pixel definition layer.

22. The display of claim 21, further comprising a transparent substrate on the at least one first pixel definition layer and the at least one second pixel definition layer, wherein the plurality of keys of the circuit board are on regions of the transparent substrate corresponding to the at least one second pixel definition layer.

23. An electronic device, comprising:
a display for a multi-function keypad comprising:
  a display panel comprising:
    a plurality of display regions each comprising at least one pixel and arranged in a matrix pattern; and
    a non-display region surrounding the plurality of display regions, the non-display region having no pixels formed therein;
  a circuit board on the display panel, the circuit board comprising a plurality of openings corresponding to the plurality of display regions, and a plurality of keys at regions of the circuit board near peripheral edges of the plurality of openings, the regions of the circuit board corresponding to the non-display region; and
  a pad on the circuit board, the pad comprising a plurality of transparent windows corresponding to the plurality of openings and a plurality of pressing units at regions of the pad near peripheral edges of the transparent windows, the regions of the pad corresponding to the plurality of keys; and
a main display panel electrically and mechanically connected to the display,
wherein each of the plurality of display regions further comprises at least one first separator, and
wherein the non-display region comprises at least one second separator wider than the at least one first separator, the at least one second separator being at a region of the non-display region, the second separator being aligned with a key of the plurality of keys of the circuit board in a direction in which the key is configured to be pressed.

* * * * *

UNITED STATES PATENT AND TRADEMARK OFFICE
CERTIFICATE OF CORRECTION

PATENT NO. : 8,259,073 B2
APPLICATION NO. : 12/106164
DATED : September 4, 2012
INVENTOR(S) : Kyongdo Kim et al.

It is certified that error appears in the above-identified patent and that said Letters Patent is hereby corrected as shown below:

Title Page is deleted and replaced with the attached Title Page consisting of FIG. 4a as shown.

In the Drawings

FIG. 4a, Sheet 5 of 13 Delete Drawing Sheet 5 and substitute therefore the Drawing Sheet, consisting of FIG. 4a, as shown on the attached page 3 of 5.

Labels need to be re-positioned.

FIG. 8, Sheet 10 of 13 Delete Drawing Sheet 10 and substitute therefore the Drawing Sheet, consisting of FIG. 8, as shown on the attached page 4 of 5.

Labels need to be re-positioned.

FIG. 9, Sheet 11 of 13 Delete Drawing Sheet 11 and substitute therefore the Drawing Sheet, consisting of FIG. 9, as shown on the attached page 5 of 5.

Labels need to be re-positioned.

Signed and Sealed this
Fourteenth Day of October, 2014

Michelle K. Lee
*Deputy Director of the United States Patent and Trademark Office*

(12) United States Patent
Kim et al.

(10) Patent No.: US 8,259,073 B2
(45) Date of Patent: Sep. 4, 2012

(54) DISPLAY FOR MULTI-FUNCTION KEYPAD AND ELECTRONIC DEVICE HAVING THE SAME

(75) Inventors: Kyongdo Kim, Yongin-si (KR); Woojong Lee, Yongin-si (KR); Hyunah Jang, Yongin-si (KR); Hyungjun Namgung, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 936 days.

(21) Appl. No.: 12/106,164

(22) Filed: Apr. 18, 2008

(65) Prior Publication Data
US 2008/0284689 A1 Nov. 20, 2008

(30) Foreign Application Priority Data
Apr. 19, 2007 (KR) .................. 10-2007-0038399

(51) Int. Cl.
G09G 5/00 (2006.01)
(52) U.S. Cl. .......................... 345/169; 345/172
(58) Field of Classification Search .......... 345/156–172, 345/173–179; 200/5 A, 314; 349/154–156
See application file for complete search history.

(56) References Cited

U.S. PATENT DOCUMENTS

| | | |
|---|---|---|
| 4,472,610 A | 9/1984 | Fuller et al. |
| 5,917,906 A | 6/1999 | Thornton |
| 6,538,374 B2 | 3/2003 | Hosokawa |
| 7,232,969 B1 * | 6/2007 | Hsu et al. .................. 200/310 |
| 2002/0107055 A1 | 8/2002 | Yamazaki et al. |
| 2002/0180676 A1 * | 12/2002 | Lee .................. 345/87 |
| 2004/0137142 A1 | 7/2004 | Nishikawa |
| 2004/0211966 A1 | 10/2004 | Guenther et al. |
| 2006/0033876 A1 | 2/2006 | Park et al. |
| 2006/0152668 A1 | 7/2006 | Jang et al. |
| 2006/0221059 A1 * | 10/2006 | Choi et al. .................. 345/169 |
| 2007/0029172 A1 * | 2/2007 | Choi et al. .................. 200/1 B |

(Continued)

FOREIGN PATENT DOCUMENTS
CN 1363200 A 8/2002
(Continued)

OTHER PUBLICATIONS

English machine translation for Japanese publication No. JP 2003-195783, published Jul. 9, 2003 in the name of Okuyama et al., 17 pgs.

(Continued)

*Primary Examiner* — Amare Mengistu
*Assistant Examiner* — Hong Zhou
(74) *Attorney, Agent, or Firm* — Christie, Parker & Hale, LLP

(57) ABSTRACT

A display for a multi-function keypad and an electronic device including the display. The display for a multi-function keypad includes: a display panel having a plurality of display regions arranged in a matrix pattern and a non-display region surrounding the plurality of display regions; a circuit board on the display panel and including a plurality of openings corresponding to the display regions, and a plurality of keys near peripheral edges of the openings and corresponding to the non-display region; and a pad on the circuit board and including a plurality of transparent windows corresponding to the openings, and a plurality of pressing units near peripheral edges of the transparent windows and corresponding to the plurality of keys.

23 Claims, 13 Drawing Sheets